US009363797B2

(12) United States Patent
Freda et al.

(10) Patent No.: US 9,363,797 B2
(45) Date of Patent: Jun. 7, 2016

(54) CONTROL SIGNALING IN LTE CARRIER AGGREGATION

(71) Applicant: INTERDIGITAL PATENT HOLDINGS, INC., Wilmington, DE (US)

(72) Inventors: Martino Freda, Laval (CA); Jean-Louis Gauvreau, La Prairie (CA); Mihaela C. Beluri, Jericho, NY (US); Rocco Di Girolamo, Laval (CA); Yuying Dai, Lachine (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 24 days.

(21) Appl. No.: 13/726,093

(22) Filed: Dec. 22, 2012

(65) Prior Publication Data

US 2013/0163543 A1    Jun. 27, 2013

Related U.S. Application Data

(60) Provisional application No. 61/579,645, filed on Dec. 22, 2011.

(51) Int. Cl.
*H04W 72/04* (2009.01)
*H04L 5/00* (2006.01)

(52) U.S. Cl.
CPC ......... *H04W 72/0406* (2013.01); *H04L 5/0092* (2013.01); *H04L 5/0007* (2013.01)

(58) Field of Classification Search
USPC ........... 370/252–328, 342–347; 455/450–509
See application file for complete search history.

(56) References Cited

U.S. PATENT DOCUMENTS

| 8,422,429 B2 * | 4/2013 | Nam et al. ............. 370/328 |
| 2010/0254268 A1 | 10/2010 | Kim et al. |

(Continued)

FOREIGN PATENT DOCUMENTS

| KR | 10-2011-0073689 A | 6/2011 |
| KR | 10-2011-0090783 A | 8/2011 |
| WO | WO 2011/085189 A1 | 7/2011 |

OTHER PUBLICATIONS

3rd Generation Partnership Project (3GPP), TS 36.321 V10.1.0, "Technical Specification Group Radio Access Network, Evolved Universal Terrestrial Radio Access (E-UTRA), Medium Access Control (MAC) Protocol Specification (Release 10)", Mar. 2011, pp. 1-53.

(Continued)

*Primary Examiner* — Man Phan
(74) *Attorney, Agent, or Firm* — Condo Roccia Koptiw LLP

(57) ABSTRACT

Methods and devices may be provided for aggregating component carriers in the licensed spectrum with at least one component carriers in the licensed exempt spectrum. Control information may be processed in a wireless transmit/receive unit (WTRU) while receiving and sending information on a primary component carrier (PCC) and a supplementary component carrier (SuppCC). A PCC subframe with a control portion and a data portion may be received. Resource assignment information associated with a downlink shared channel on the PCC may be embedded in the control portion of the subframe. Based on the resource assignment information on the PCC, resource assignment information associated with a downlink shared channel on the SuppCC may be identified in the data portion of the PCC subframe. A SuppCC subframe of the shared channel on the SuppCC may be processed as per the identified resource assignment information associated with the downlink shared channel on the SuppCC.

10 Claims, 33 Drawing Sheets

(56) References Cited

U.S. PATENT DOCUMENTS

| | | | |
|---|---|---|---|
| 2010/0322154 A1 | 12/2010 | Chen et al. | |
| 2011/0170496 A1 | 7/2011 | Fong et al. | |
| 2011/0292812 A1* | 12/2011 | Kim et al. | 370/242 |
| 2012/0039275 A1* | 2/2012 | Chen et al. | 370/329 |
| 2012/0087254 A1* | 4/2012 | Yin et al. | 370/252 |
| 2012/0243499 A1* | 9/2012 | Moon et al. | 370/329 |
| 2012/0257554 A1 | 10/2012 | Kim et al. | |
| 2012/0300741 A1 | 11/2012 | Han et al. | |
| 2013/0044654 A1* | 2/2013 | Chen et al. | 370/280 |
| 2013/0077593 A1* | 3/2013 | Han et al. | 370/329 |
| 2013/0188592 A1* | 7/2013 | Yang et al. | 370/329 |
| 2013/0279441 A1* | 10/2013 | Lee et al. | 370/329 |
| 2014/0010182 A1* | 1/2014 | Chunli et al. | 370/329 |
| 2014/0071908 A1* | 3/2014 | Sachs et al. | 370/329 |
| 2014/0086117 A1* | 3/2014 | Zhang et al. | 370/280 |

OTHER PUBLICATIONS

3rd Generation Partnership Project (3GPP), TS 36.331 V10.1.0, "Technical Specification Group Radio Access Network, Evolved Universal Terrestrial Radio Access (E-UTRA), Radio Resource Control (RRC), Protocol Specification (Release 10)", Mar. 2011 pp. 1-290.

3rd Generation Partnership Project (3GPP), R1-094082, "PDCCH Extension to Support Operation with CI", Samsung, 3GPP TSG RAN WG1 #58bis, Miyazaki, Japan, Oct. 12-16, 2009, 2 pages.

3rd Generation Partnership Project (3GPP), R1-094646, "PHICH Resources in LTE-Advanced", Nokia, Nokia Siemens Networks, 3GPP TSG RAN WG1 Meeting #59, Jeju, Korea, Nov. 9-13, 2009, 4 pages.

3rd Generation Partnership Project (3GPP), R1-100841, "On PHICH for Carrier Aggregation", Ericsson, ST-Ericsson, 3GPP TSG RAN WG1 Meeting #60, San Francisco, USA, Feb. 22-26, 2010, 2 pages.

3rd Generation Partnership Project (3GPP), R1-102197, "Discussion on PDCCH Capacity Considering MU-MIMO", Samsung, 3GPP TSG RAN WG1 #60b, Beijing, China, Apr. 12-16, 2010, 6 pages.

3rd Generation Partnership Project (3GPP), TS 36.101 V10.1.0, "Technical Specification Group Radio Access Network, Evolved Universal Terrestrial Radio Access (E-UTRA), User Equipment (UE) Radio Transmission and Reception (Release 10)", Dec. 2010, pp. 1-198.

3rd Generation Partnership Project (3GPP), TS 36.211 V10.1.0, "Technical Specification Group Radio Access Network, Evolved Universal Terrestrial Radio Access (E-UTRA), Physical Channels and Modulation (Release 10)", Mar. 2011, pp. 1-103.

3rd Generation Partnership Project (3GPP), TS 36.212 V10.1.0, "Technical Specification Group Radio Access Network, Evolved Universal Terrestrial Radio Access (E-UTRA), Multiplexing and Channel Coding (Release 10)", Mar. 2011, pp. 1-76.

3rd Generation Partnership Project (3GPP), TS 36.213 V10.1.0, "Technical Specification Group Radio Access Network, Evolved Universal Terrestrial Radio Access (E-UTRA), Physical Layer Procedures (Release 10)", Mar. 2011, pp. 1-115.

3rd Generation Partnership Project (3GPP), TS 36.213 V8.8.0, "Technical Specification Group Radio Access Network; Evolved Universal Terrestrial Radio Access (E-UTRA); Physical layer procedures (Release 8)", Sep. 2009, pp. 1-77.

3rd Generation Partnership Project (3GPP), TS 36.300 V10.3.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 10)", Mar. 2011, pp. 1-197.

3rd Generation Partnership Project (3GPP), TS 36.322 V10.0.0, Technical Specification Group Radio Access Network; Evolved Universal Terrestrial Radio Access (E-UTRA); Radio Link Control (RLC) protocol specification (Release 10), Dec. 2010, pp. 1-39.

Dahlman et al., "3G Evolution-HSPA and LTE for Mobile Broadband", 2007, 485 pages.

European Telecommunications Standards Institute (ETSI), TR 102 907 V1.1.1, "Reconfigurable Radio Systems (RRS); Use Cases for Operation in White Space Frequency Bands", Oct. 2011, pp. 1-62.

European Telecommunications Standards Institute (ETSI), TR 102 907 V0.0.9, "Reconfigurable Radio Systems (RRS), Use Cases for Operation in White Space Frequency Bands", Jan. 2011, 54 pages.

3$^{rd}$ Generation Partnership Project (3GPP), R1-102618, "Considerations on non-CA based heterogeneous deployments", Ericsson, ST-Ericsson, 3GPP TSG-RAN WG1, Meeting #61, Montreal, Canada, May 10-14, 2010, 3 pages.

* cited by examiner

CONTROL SIGNALING IN LTE CARRIER AGGREGATION

CROSS REFERENCE TO RELATED APPLICATIONS

This application claims the benefit of U.S. Provisional Patent Application No. 61/579,645 filed Dec. 22, 2011, the contents of which are hereby incorporated by reference herein.

BACKGROUND

As a result of the transition from analogue to digital TV transmissions, for example in the 470-862 MHz frequency band, certain portions of the spectrum may no longer be used for TV transmissions, though the exact frequency of unused spectrum may vary from location to location. These unused portions of spectrum may be referred to as TV White Space (TVWS). The Federal Communications Commission (FCC) has opened up these TVWS frequencies for a variety of unlicensed uses. These frequencies may be exploited by secondary users for any radio communication, and such frequencies may be used by the LTE and other cellular technologies. Long Term Evolution (LTE) may also use other unlicensed bands such as Industrial, Scientific and Medical (ISM) band.

When an LTE system operates in a license exempt (LE) band, the same spectrum may be shared with other secondary users using a radio access technology different from LTE. Coexistence with other secondary users may result in the LTE system operating in an environment with higher interference signals, not typically present in licensed band. For example, an LTE system may coexist with a Wi-Fi system. Some of the Wi-Fi systems may use a backoff threshold of −62 dBm. Therefore, unless the Wi-Fi system is very close to the eNB operating on the supplementary component carrier (SuppCC), interference from the Wi-Fi system may need to be overcome by Physical Datalink Control Channel (PDCCH). Although cross-carrier scheduling may be used to schedule resources in the SuppCC from PDCCH on the licensed band, PDCCH congestion may occur even for a small number of SuppCCs.

When the PDCCH is signaled on the SuppCC, it may experience interference from primary users operating in adjacent channels. It may also experience interference from secondary users sharing the same channel. In addition, a simple increase in the signal to noise ratio (SNR) may not be enough to address the PDCCH performance.

For reliable PDCCH operation, cross-carrier scheduling may be used from the primary cell to allocate supplementary cell resources. However, PDCCH congestion/blocking may occur within the system. The use of supplementary cell to carry PDCCH signals may be provided.

SUMMARY

Disclosed herein are methods and apparatuses for aggregating component carriers in the licensed spectrum with one or more component carriers in a licensed exempt spectrum. For example, control information may be processed in a wireless transmit/receive unit (WTRU) while receiving and sending information on a primary component carrier (PCC) and a supplementary component carrier (SuppCC). A PCC subframe with a control portion and a data portion may be received. Embedded in the control portion of the subframe may be resource assignment information associated with a downlink shared channel on the PCC. Based on the resource assignment information on the PCC, resource assignment information associated with a downlink shared channel on the SuppCC may be identified in the data portion of the PCC subframe. A SuppCC subframe of the shared channel on the SuppCC may be processed as per the identified resource assignment information associated with the downlink shared channel on the SuppCC. The WTRU may identify, in a data portion of a second PCC subframe, an uplink grant that may be associated with an uplink channel on the SuppCC. The uplink grant may be identified based on the resource assignment information associated with the downlink shared channel on the PCC.

In an embodiment, the WTRU may decode control information based on a downlink control information (DCI) format type corresponding to a Physical Downlink Control Channel (PDCCH) candidate search space. For example, a first search space may include PDCCH candidates for decoding control information using a first DCI format type, and a second search space may include PDCCH candidates for decoding the control information using a second DCI format type. The PDCCH candidates in the two search spaces may be distinct. The WTRU may perform blind decoding the PDCCH candidates in the first search space based on the first DCI format type, and the PDCCH candidates in the second search space based on the second DCI format type.

In an embodiment, a search space may be reconfigured by sending multiple measurements related to a supplementary channel from a WTRU. The WTRU may receive, a search space reconfiguration signal (SSRS), indicating the change in aggregation level mode of the WTRU at a particular subframe. The SSRS may be based on the signal to interference plus noise ratio (SINR) value specific to the WTRU. The aggregation level mode, based on the SSRS, may be changed from one order, for example of lower order space aggregation level to a different order, for example, a higher order aggregation level.

In an embodiment, the aggregation mode level change may be triggered by comparing averaged SINR with a threshold SINR. The WTRU may receive an indication on when to operate in Extended Aggregation Level Mode and/or the normal aggregation level mode.

In an embodiment, PDCCH congestion may be managed, for example, by detecting congestion on a particular PDCCH of a primary cell. The WTRUs with unavailable PDCCH resources may be identified, and indication to receive PDCCH on a supplementary cell may be sent to the WTRUs.

BRIEF DESCRIPTION OF THE DRAWINGS

A more detailed understanding may be had from the following description, given by way of example in conjunction with the accompanying drawings.

DETAILED DESCRIPTION

Figure 1A:
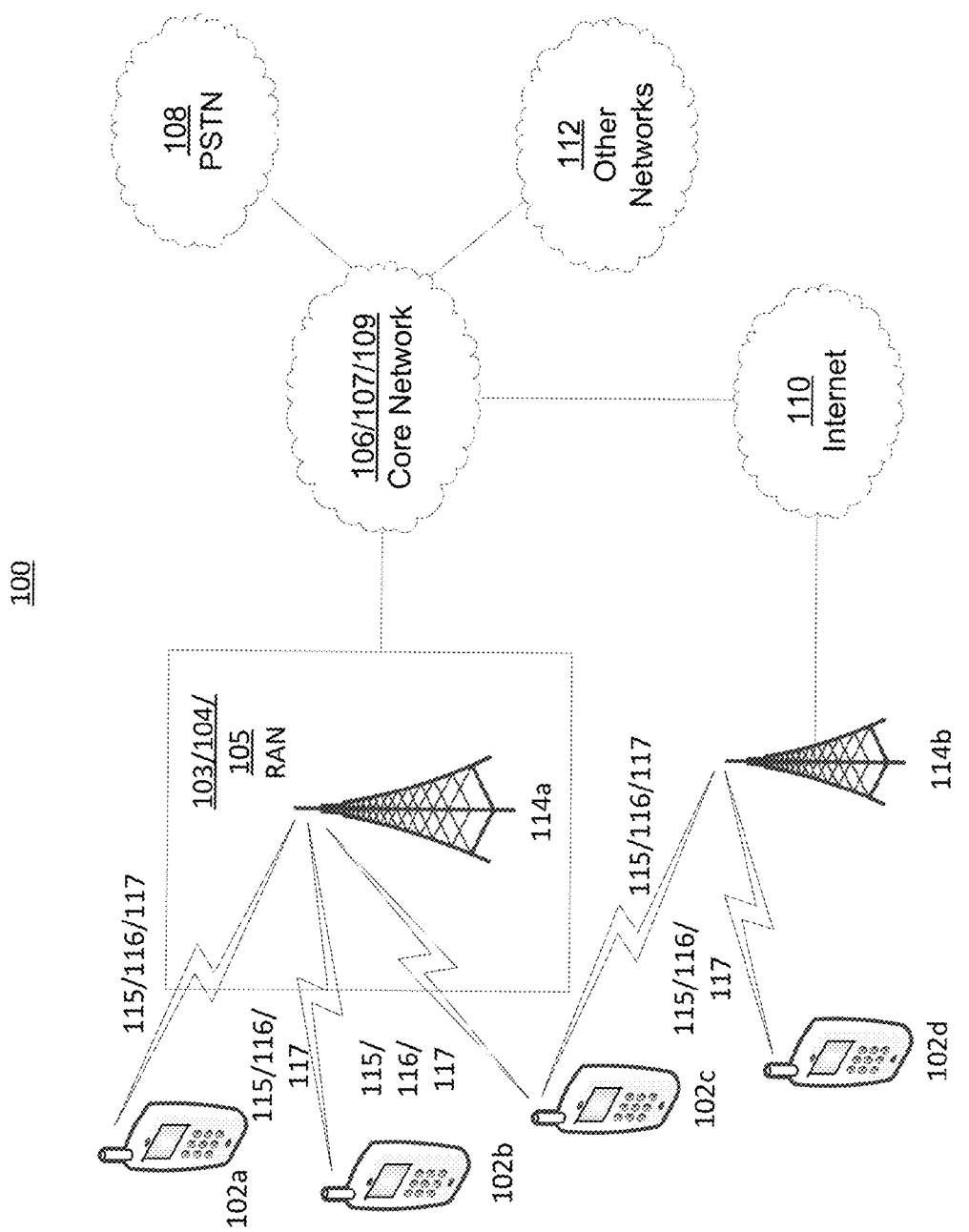
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
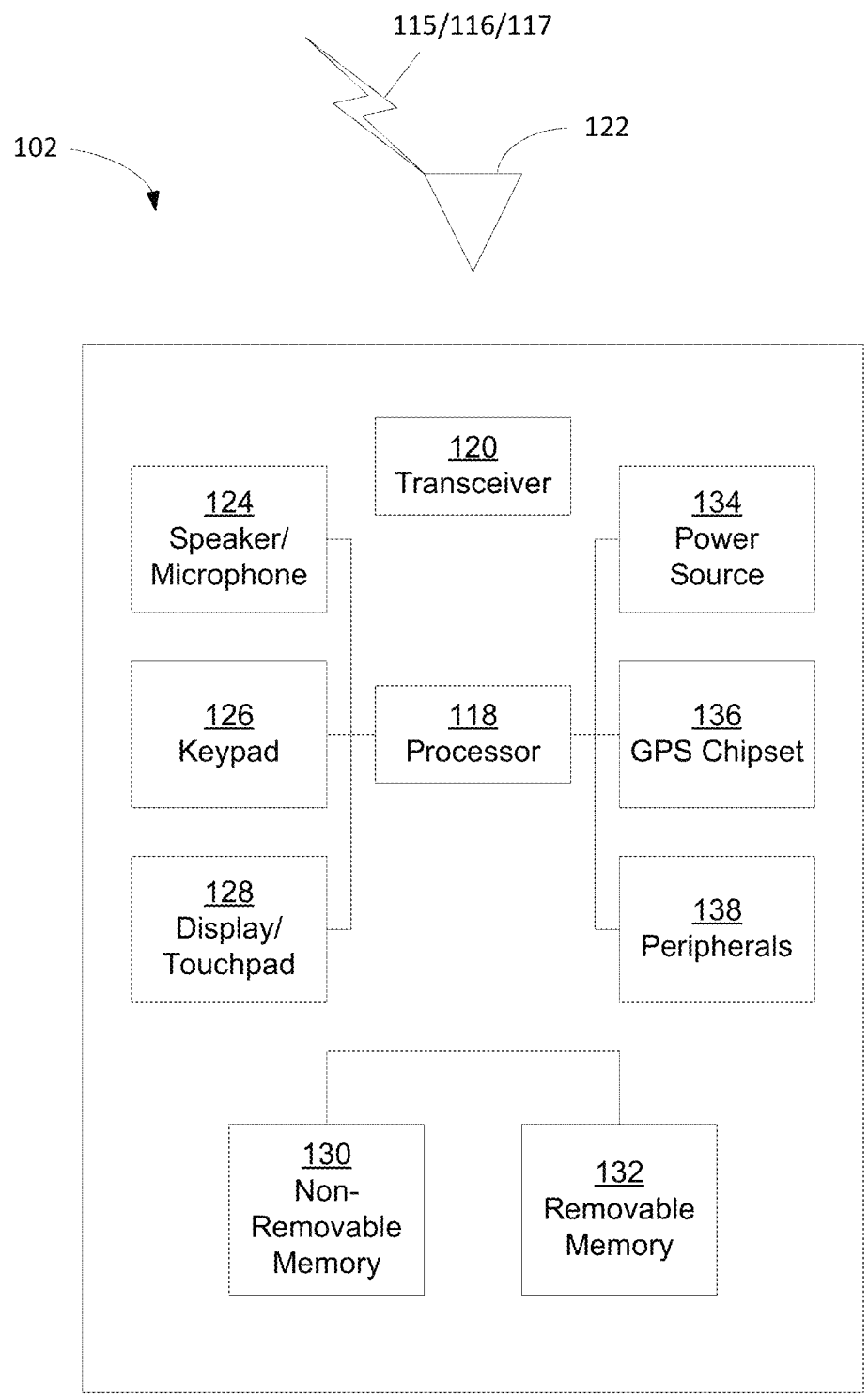
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
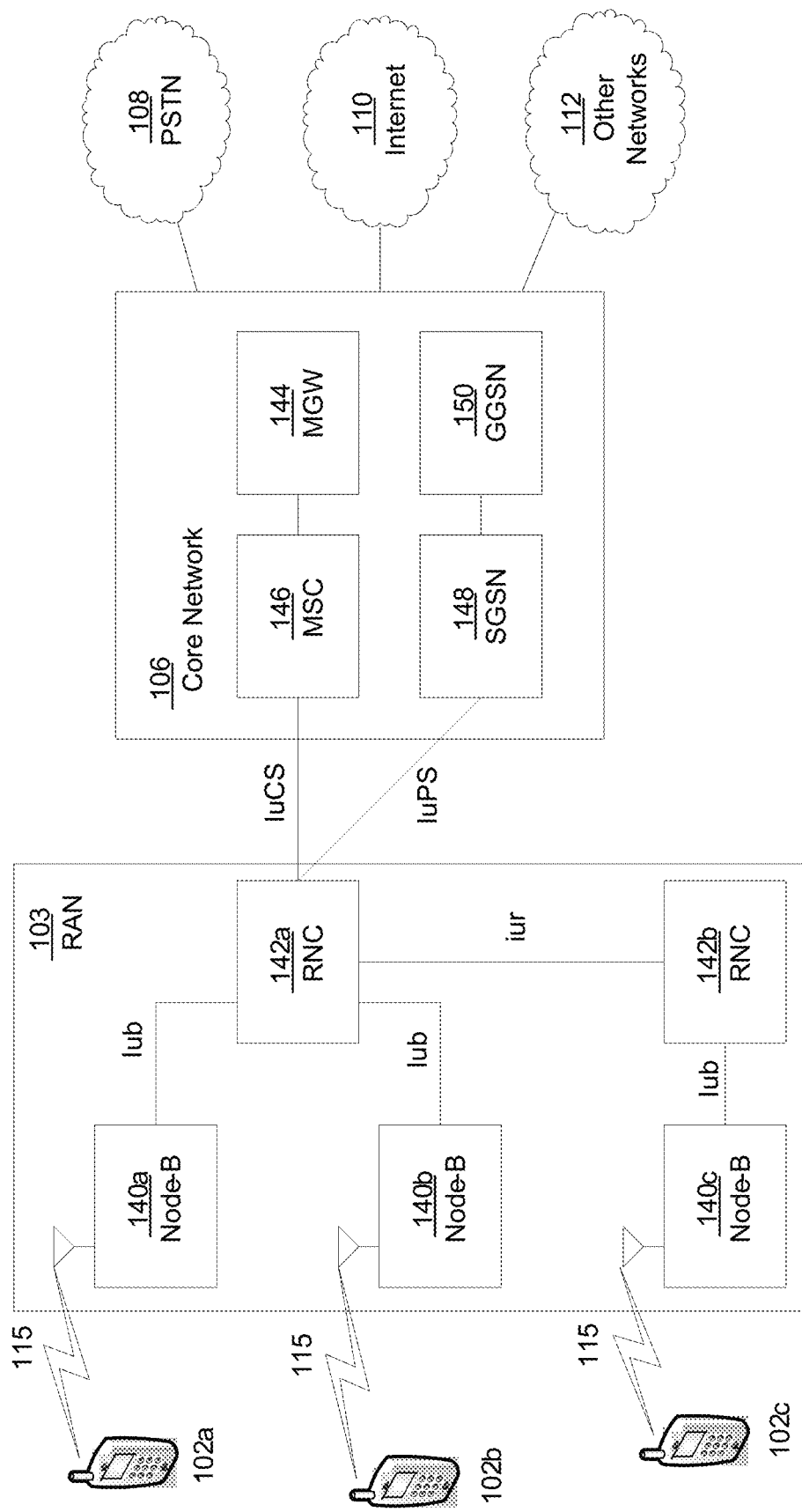
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
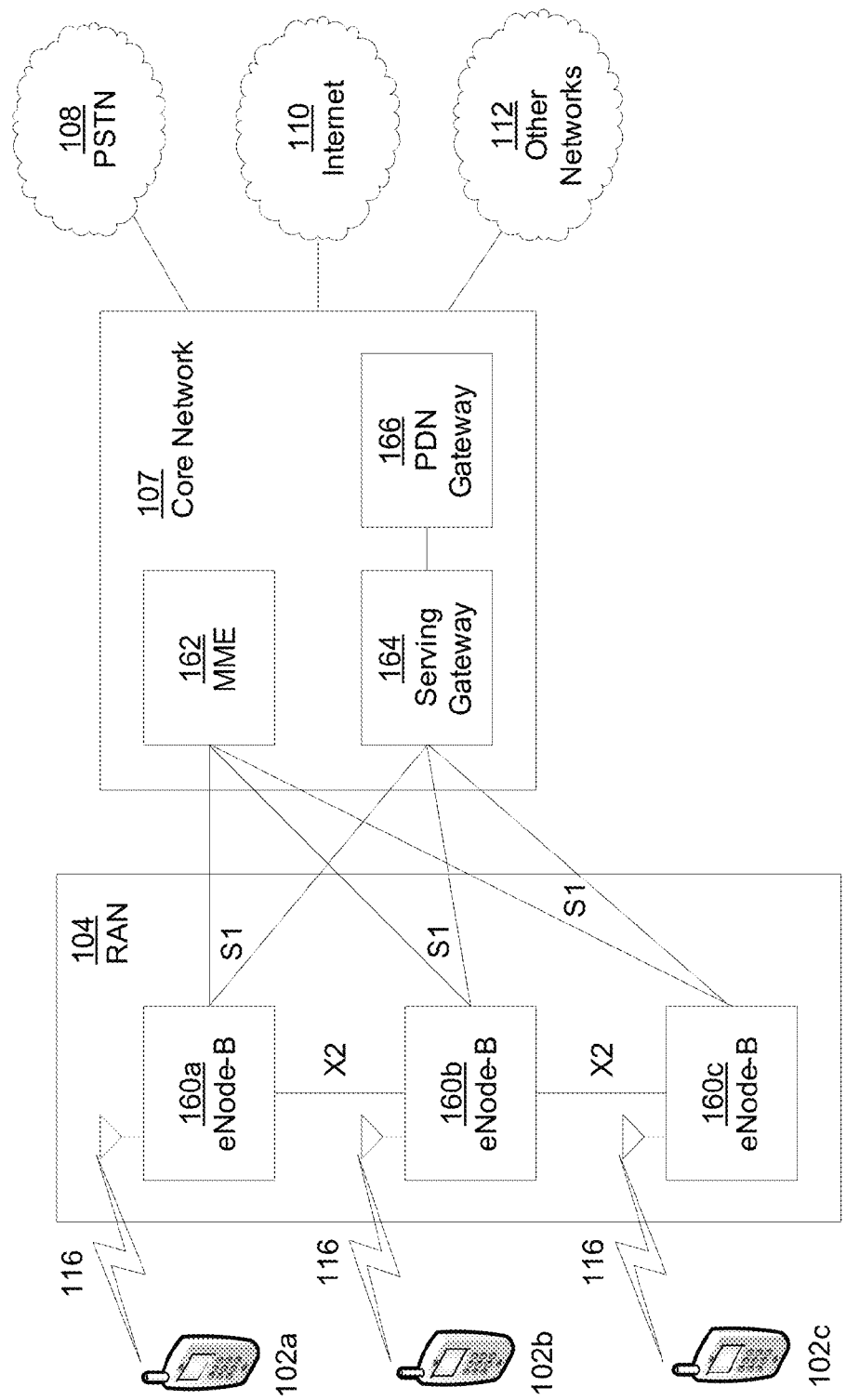
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
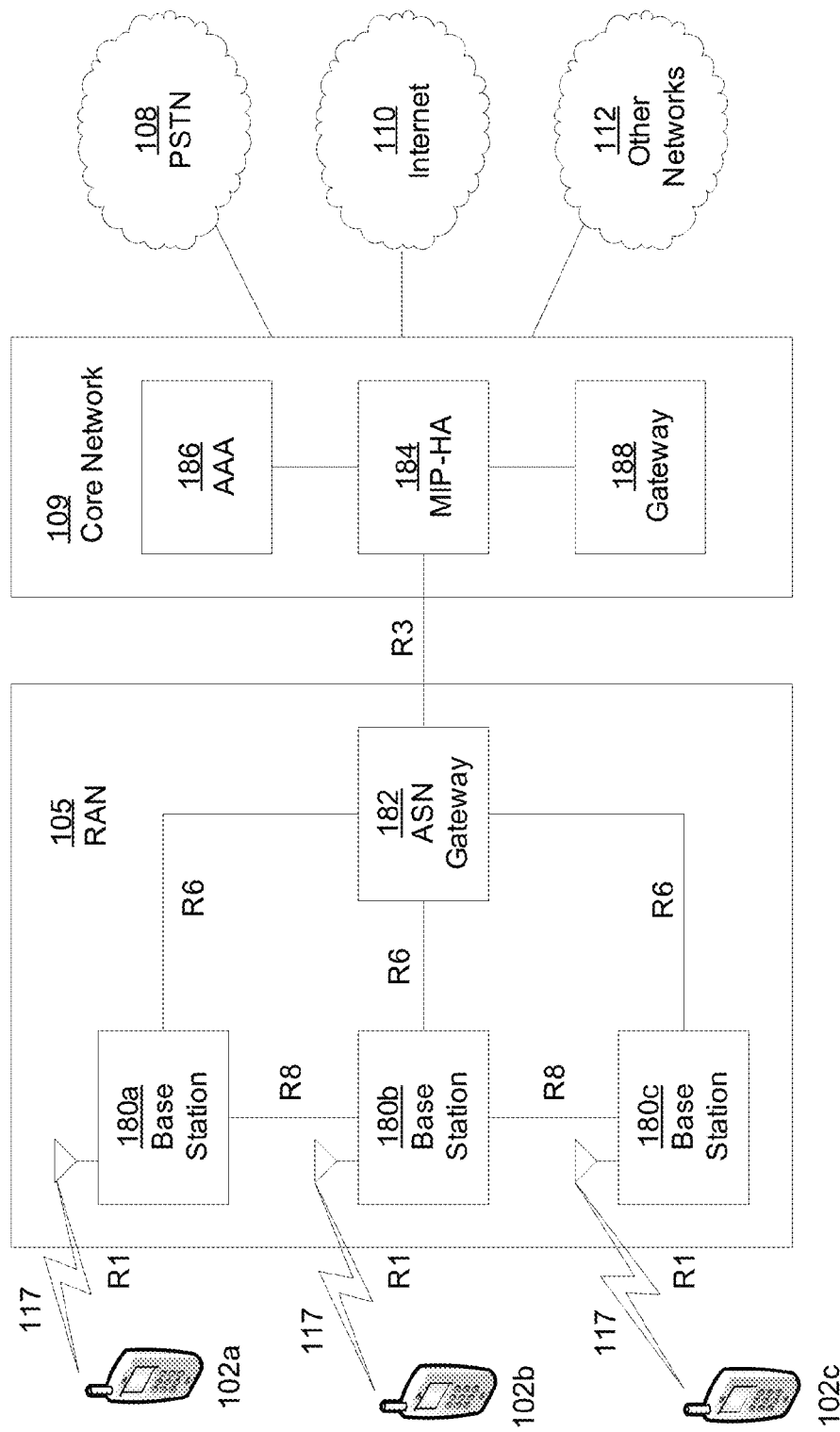
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The proliferation of machine type communication (MTC) devices has the potential to lead to various network related issues, including data overload and traffic congestion. For example, even when each of several MTC devices is individually configured to generate minimal signal traffic, the sheer number of such devices in operation may collectively lead to a situation wherein a large traffic volume is generated, and the associated network may become overloaded. For example, it is expected that the number of MTC device in communication over the network may be several orders of magnitude. With such a large number of devices attempting to connect to the network, network overload may occur in situations where a large number of devices attempt to be connected to the network at substantially the same time and/or when a large number of devices transmit and/or receive messages at substantially the same time and/or periodicity (e.g., reporting sensor measurements or other periodic reporting), even when these messages themselves carry small amounts of data.

The 3GPP specification TR 22.368 provides example definitions pertaining to MTC small signal transmissions for MTC devices that send and/or receive small amounts of data. For example, it may be a system wide goal for the network to support transmissions of small amounts of data with minimal network impact, for example by limiting the associated signaling overhead, optimizing the use of network resources, minimizing delay for reallocation of the resources and/or the like. What constitutes a small amount of data for the network perspective may be configurable on the basis of a subscription policy and/or a network operator policy.

Many MTC devices may communicate with a MTC Server. The MTC Server may be a collection point for communications received from MTC devices. For example, the MTC devices may communicate with the MTC server via the Core Network of the cellular network. In an example, the MTC Server may be a node in the Core Network. Data congestion may occur in a mobile core network or in a communication link to the MTC server when a large number of MTC devices send/receive data simultaneously. For example, in many MTC applications, a larger number of MTC devices associated with a single MTC user may connect to a single MTC server that is coupled to a packet network of a mobile network operator via an access point name (APN) using an MTCi interface.

The data congestion may be mitigated by optimizing the resources utilized, and by reducing the signaling overhead, so as to provide scalability in the presence of a large number of devices. In an example, a group of devices is configured to share an evolved packet system (EPS) bearer or a packet data protocol (PDP) context as described herein.

Figure 2A:
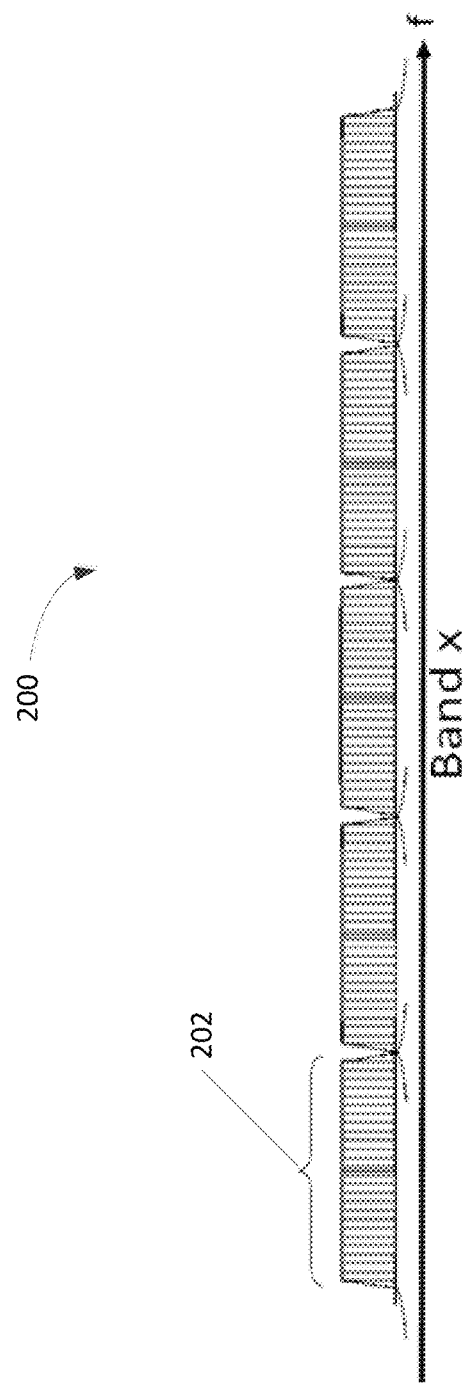
FIGS. 2A-2C illustrate by example, various carrier aggregation types.
Figure 2B:
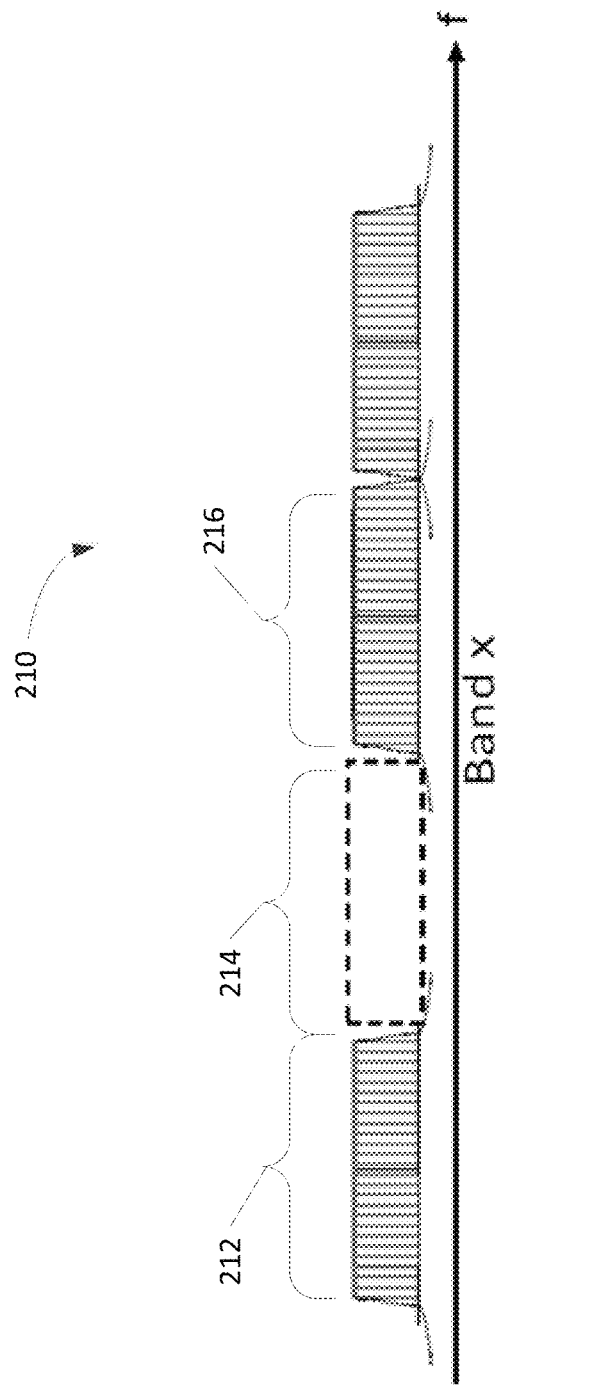
Figure 2C:
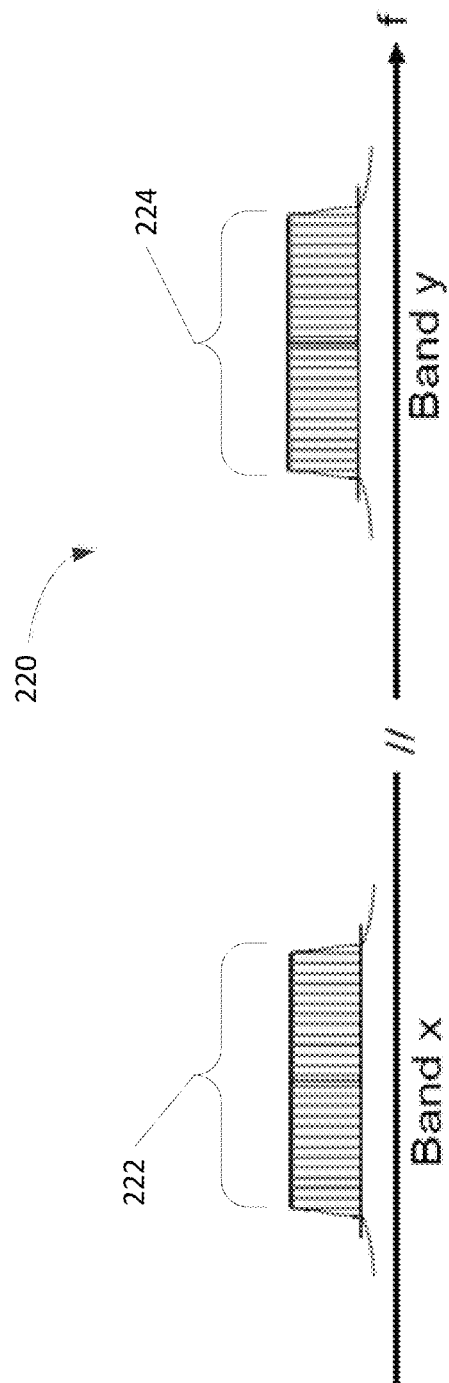

FIGS. 2A to 2C illustrate three types of carrier aggregation—Intra-band contiguous, Intra-band non-contiguous and Inter band non-contiguous. In LTE-Advanced, two or more (up to 5) component carriers (CCs) may be aggregated in order to support wider transmission bandwidths up to 100 MHz. A WTRU may simultaneously receive or transmit on one or more CCs. It may also be capable of aggregating a different number of differently sized CCs in the uplink (UL) or the downlink (DL). As shown in the FIGS. 2A to 2B, carrier aggregation (CA) may be supported for both contiguous and non-contiguous CCs. For example, FIG. 2A illustrates an intra-band contiguous CA 200, where the multiple adjacent CCs, 202 may be aggregated to produce contiguous bandwidth wider than 20 MHz. FIG. 2B illustrates an intra-band non-contiguous CA 210, where the multiple CCs 212 and 216 may belong to the same band but may not be adjacent to one another. As shown in FIG. 2B, the two CCs may be separated by empty bandwidth 214. FIG. 2C illustrates an inter-band non-contiguous CA 220, where the multiple CCs, e.g., 222 and 224 belonging to different bands x and y may be aggregated.

The SuppCC may be used in opportunistic fashion in the license exempt (LE) bands to make use of advanced carrier aggregation solutions for providing hot-spot coverage and/or traffic offload. The heterogeneous network architecture includes, for example, a macro cell providing service continuity, and a pico/femto/radio remote head (RRH) cell that may aggregate the licensed and LE bands to provide the increase bandwidth associated with the hot-spot.

In LE bands, the availability of channels, the need to coexist with other secondary users of the LE bands, and to respect the regulatory rules imposed for operation on e.g., TVWS bands, where primary users have priority access, may require certain changes to LTE operation. A supplementary component carrier (SuppCC) or supplementary cell operating in the LE band may be used. This cell may support a limited set of channels/features/functionality with respect to the secondary cell carrier.

The supplementary component may, for example, operate on "channels" in unlicensed bands. The availability of the channels may be more random. The quality of the unlicensed band channel may not be guaranteed as other secondary users, using different radio access technology may also be present on this band. In an embodiment, the supplementary cells may not be backward compatible with, for example, Release 10 (R10) of LTE, and the WTRUs may not camp on the supplementary cell.

Further, the supplementary cell may be available in B MHz slices. For example, in North America, the TVWS channel (6 MHz) may allow support of a single 5 MHz LTE carrier per channel, making B equal to 5 MHz.

The frequency separation between component carriers in aggregated supplementary cells may be random (and may be very low), and may depend on a number of factors, for example, availability of TVWS channels, the capabilities of the devices, and/or the sharing policies between neighbor systems, etc.

In an embodiment, the use of a single channel spectrum scheme may be preferred over paired spectrum FDD in the TVWS. The expected limited availability of TVWS channels may make paired spectrum operation more difficult. Further, if a primary incumbent appears in the TVWS, it may be less likely to cause the evacuation single channel system than a paired channel system. And in the case of FDD, the sensing may be performed on two separate channels.

The bi-directional traffic capability for the SuppCC may be provided by the following schemes: the use of a TDD SuppCC, and/or the use of a dynamic FDD SuppCC.

Control signaling in L1/L2 may be performed using the physical downlink control channel (PDCCH). The PDCCH may occupy the first 1 to 3 OFDM symbols of each subframe (with actual size signaled by the physical control format indicator channel (PCFICH) in that specific subframe). The resource elements available to PDCCH may be obtained by removing the resource elements used for PCFICH and physical hybrid automatic repeat request indicator channel (PHICH). These resource elements may be structured into control channel elements (CCEs) consisting of a group of, for example, 36 useful resource elements in the control area (or, e.g., nine resource element groups (RGs)).

The CCE structure may be used in the decoding process associated with the PDCCH. Allocations and uplink grants (as well as power control commands) may be sent using downlink control information (DCI) messages with distinct formats. For example, section 5.3.3 of 3GPP TS 36.212 v10.1.0, describes format 0 as DCI used for uplink grants. Formats 1, 1A, 1B, 1C and 1D may be used for downlink allocations of one transport block per TTI. Formats 2, 2A, 2B may be used for downlink allocations of two transport blocks per TTI (spatial multiplexing). Formats 3, 3A may be used for power control. Format 4 may be used for uplink grants with multi antenna port transmission mode.

For a given DCI, the assignment of the DCI formats to CCEs in the PDCCH may be done, for example, using 1, 2, 4, or 8 CCEs. These sizes may be referred to as aggregation levels. For example, a PDCCH with aggregation level 4 may transmit the DCI message using 4 CCEs. The number of CCEs used to send a given DCI format may depend on the length (in bits) of the DCI message, and the encoding used for that format. To avoid the need to decode various combinations of formats and coding rates, certain rules may be defined to limit the "blind decoding" that needs to be performed by a WTRU. A DCI format with aggregation level n may start at a CCE number that is divisible by n. The DCI formats may depend on the transmission mode of the WTRU. And, although the DCI message lengths may be variable, they may be mapped to the CCEs at each aggregation level in such a way that, for a given transmission mode, a WTRU may perform blind decoding for two different DCI lengths.

Decoding DCI may include checking the cyclic redundancy check (CRC) with one of the RNTI's for the WTRU (e.g. C-RNTI, SPS RNTI, etc.), since the Radio Network Temporary Identifier (RNTI) may be part of the CRC generation. Each decoding attempt may include checking the given set of CCEs under the assumption of one of the DCI format lengths for the RNTIs, the WTRU may monitor.

In order to search for PDCCH assigned to a specific WTRU, the decoding process may further include checking or decoding search spaces (set of CCEs) in a given subframe. Each WTRU may have a specific search space assigned to it. The WTRUs may search the common search space for messages that may be sent to the WTRUs simultaneously (using the system information RNTI (SI-RNTI), for example). A fixed number of PDCCH candidates may be defined for the search spaces in various aggregation levels. Examples may be found in table 9.1.1-1 of 3GPP TS 36.213 v10.1.0.

The location of the WTRU specific PDCCH candidates (in terms of CCE numbers) may depend on the WTRU's RNTI and the subframe number such that the location of the WTRU specific PDCCH candidates may be unique and may change on a subframe basis. The common search space candidates (e.g., in aggregation levels 4 and 8) may be at a fixed location and may depend on the aggregation level, and the total number of CCEs available in the PDCCH for that subframe. For example, the location for both the common and WTRU specific search spaces (in terms of the CCE numbers) may be defined by a common formula, for example:

$$L \cdot \{(Y+m) \bmod \lfloor N_{CCE}/L \rfloor\} + i \quad (1)$$

In the above equation, L may represent the aggregation level, for example 1, 2, 4, or 8. $N_{CCE}$ may be the number of CCEs available in the PDCCH, m may be the candidate number (which may run, for example from 0 to $M^{(L)}-1$) and i may correspond to the CCE index number within a candidate (which may run, for example from 0 to L−1). The starting CCE for a given candidate may be given by the first portion of the equation, and the index number may show that a candidate may consist of consecutive CCEs.

The value of $M^{(L)}$ and the number of PDCCH candidates that a WTRU may monitor in a given aggregation level may be as provided in Table 1.

TABLE 1

| | Search space $S_k^{(L)}$ | | |
|---|---|---|---|
| Type | Aggregation level L | Size [in CCEs] | Number of PDCCH candidates $M^{(L)}$ |
| WTRU- specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The parameter Y of the equation 1 may be defined, for example as in the 3GPP TS 36.213 (LTE Rel. 8) and may be dependent on both the subframe number and the RNTI for WTRU specific search spaces. For the common search space, Y may be 0. The ability of the eNB to perform cross-carrier scheduling may result in some impact on search spaces and the DCI formats. In order to allow greater flexibility to the scheduler while using cross-carrier scheduling, the search spaces as provided by the equation 1 may be extended, and a set of search space candidates may be created. The search space may be within the same PDCCH of the "scheduling" cell, where the locations of each candidate may depend on the carrier indicator field (CIF) of the scheduled PDSCH carrier. When cross-carrier scheduling is enabled for a WTRU, the candidate locations may be defined by (e.g., section 9.1.1 of 3GPP TS 36.213 v10.1.0):

$$L \cdot \{(Y+m+M^{(L)} \cdot n_{CI}) \bmod \lfloor N_{CCE}/L \rfloor\} + i$$

where $n_{CI}$ may be the CIF value of the PDSCH carrier being scheduled. Effectively, this may create a different set of search spaces in the "scheduling CC" for each of the CCs that may be scheduled. Each search space set may use the same PDCCH resources. However, based on the PDSCH carrier being scheduled, the organization of the candidates within the PDCCH may be different. The above equation 1 shows that for a given PDCCH candidate m at aggregation level L, the starting CCE for that candidate may vary based on the CC being considered.

Further, there may be an overlap of a candidate in the common search space and the WTRU-specific search space. If a common search space for a DCI format without CIF and a WTRU specific search space for a DCI format with Cell ID (CID) overlap, and the payload sizes of the DCI formats are the same, either of the DCI format on the common or WTRU specific may be allowed to be transmitted on the overlapped portion of the search space. In this case, the WTRU may assume that the PDCCH candidate of the common search space may be transmitted, and may not decode the DCI format with the CIF.

Cross-carrier scheduling may be supported for carrier aggregation. In some scenarios, when cross-carrier scheduling is employed, PDCCH congestion may occur. This congestion may be avoided by spreading the overall PDCCH system load evenly over multiple component carriers, each of the CCs carrying PDCCH.

To assess the PDCCH congestion issue, the system level simulations may be run. The test bench may, for example, implement a scenario of an LTE system aggregating a 5 MHz licensed primary cell operating in the licensed band, with up to four downlink supplementary cells operating in TVWS. The primary cell may carry the entire load of scheduling resources on both the primary and supplementary cells. The supplementary cells may carry no PDCCH. With a relatively small number of WTRUs in the system (each of the WTRUs assuming full-buffer traffic), the system may quickly reach full utilization of PDCCH. The resulting utilization of PDSCH on the Supplementary Cells shows that, for example, with as few as 10 WTRUs, the system may support allocation of resources on a single supplementary cell due to shortage of PDCCH on the primary cell that may make these allocations.

Figure 3A:
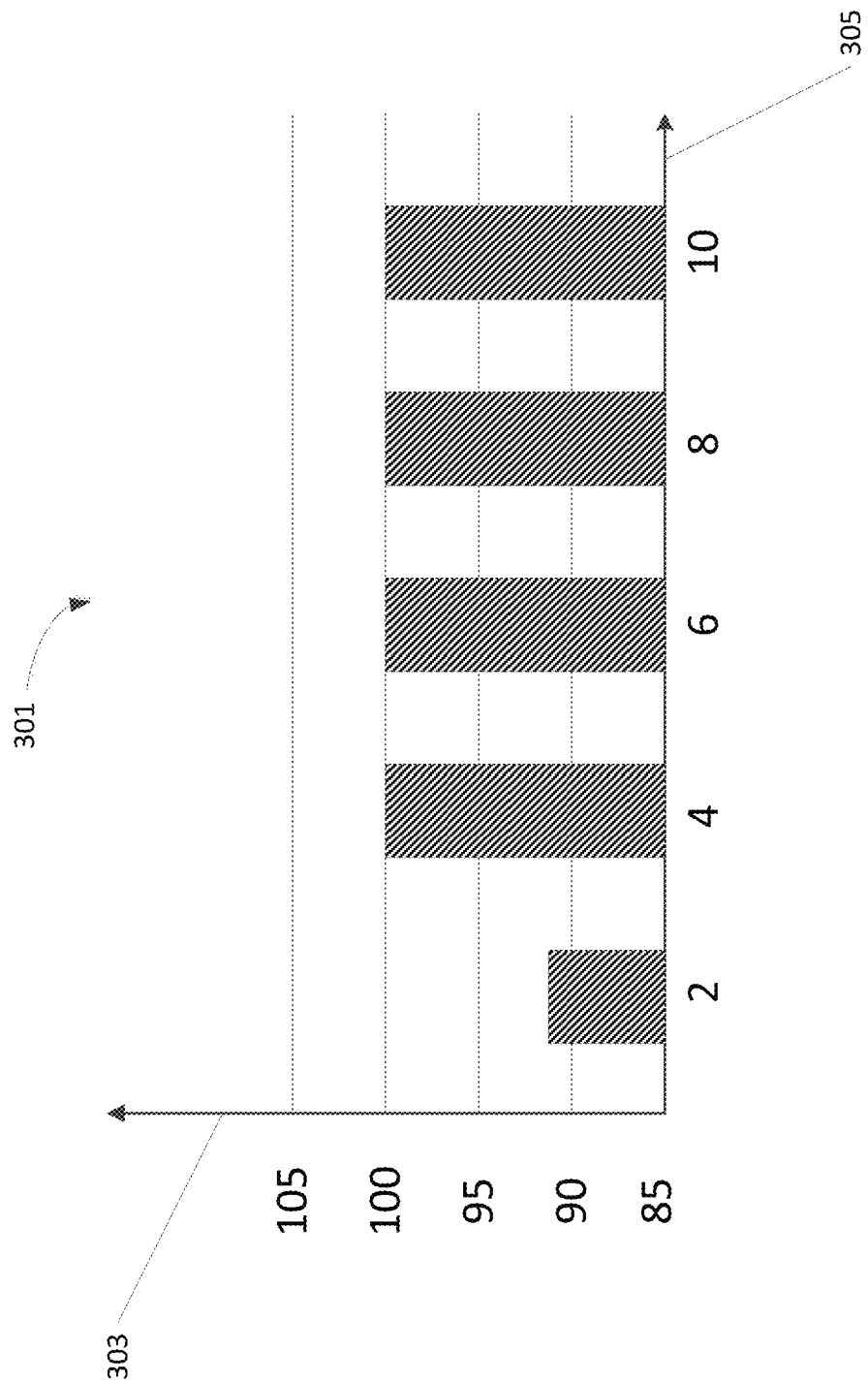
FIG. 3A illustrates by example, primary cell PDCCH utilization for a system aggregating up to four SuppCCs.
Figure 3B:
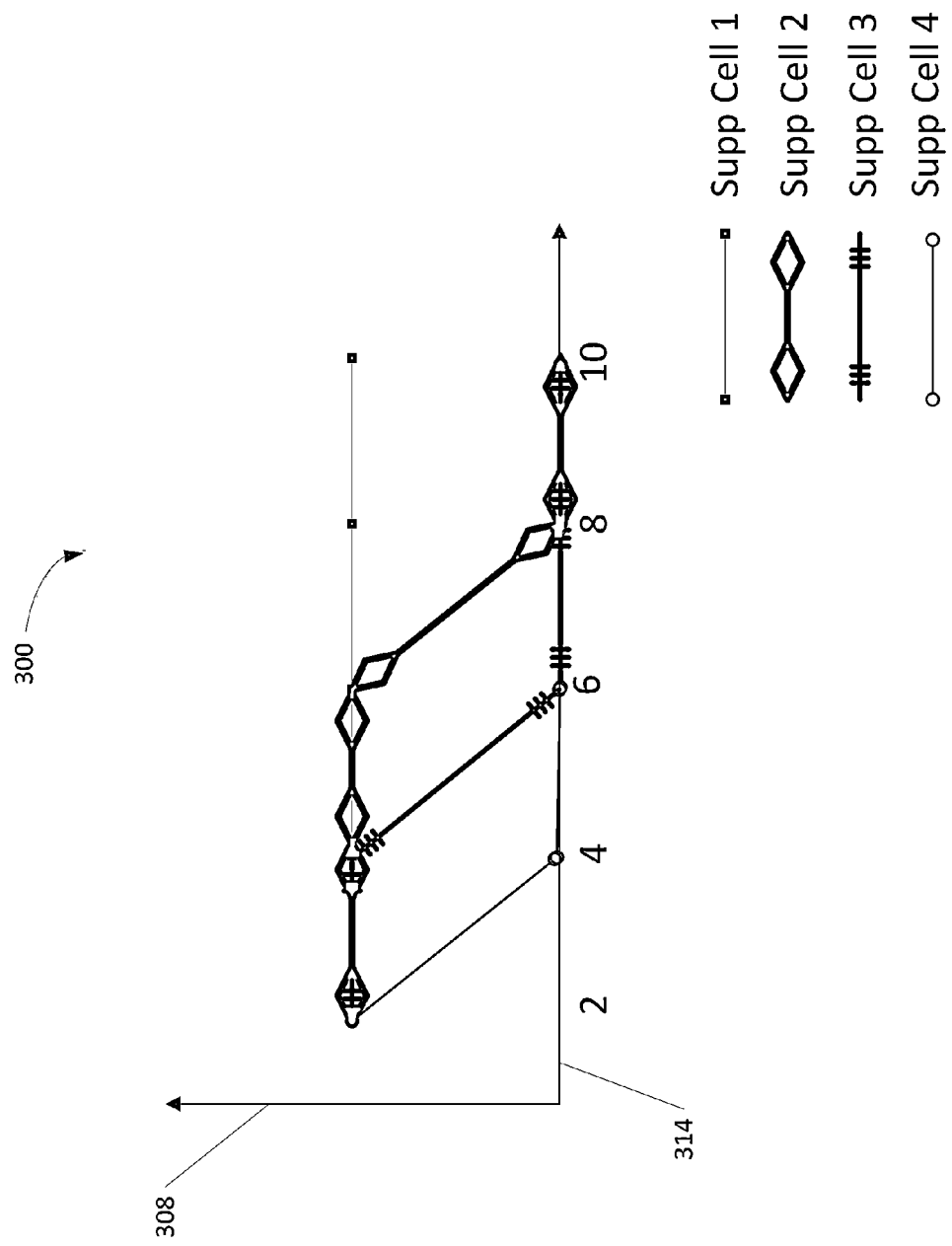
FIG. 3B illustrates by example, PDSCH utilization decrease due to PDCCH congestion on primary cell.

FIGS. 3A and 3B illustrate the simulation results. In FIG. 3A, the graph 301 illustrates primary cell PDCCH utilization for a system aggregating, for example, up to four SuppCCs. In FIG. 3A, the x-axis 305 may represent number of WTRUs and the y-axis, 303 may represent the percentage of PDCCH utilization.

FIG. 3B illustrates PDSCH utilization decrease due to PDCCH congestion on the primary cell. In FIG. 3B, the x-axis 314 may represent number of WTRUs and the y-axis, 308 may represent the percentage of PDSCH utilization Although these results may have been collected for a scenario of 5 MHz primary cell, they may scale consistently with discussions and simulation results presented, for example, in 3GPP, R1-094646 and 3GPP, R1-102197.

An LTE system may operate in the presence of primary user interference coming from adjacent channels. In the context of TVWS, a TV broadcast may operate in the channel immediately adjacent to (or in the second adjacent channel) and the channel used by the SuppCC may cause significant interference, when the LTE system may be relatively close to a broadcast tower.

The emission mask that regulates out of band emission may limit for a digital television (DTV) transmission and may require a 46 dB attenuation of the DTV transmitter from its average power at the channel edge. Such transmitters may transmit at 86 dBm. Based on Hata Model calculations for the path loss, Table 2 illustrates that a SuppCC may deal with a significant amount of interference from adjacent channel DTV even when the LTE system may be located at a significant distance.

TABLE 2

| Interference | First Adjacent Channel | | | Second Adjacent Channel | | |
|---|---|---|---|---|---|---|
| level | Urban | Suburban | Rural | Urban | Suburban | Rural |
| −70 dBm | 1.2 km | 1.8 km | 9 km | 200 m | 300 m | 2 km |

Figure 4:
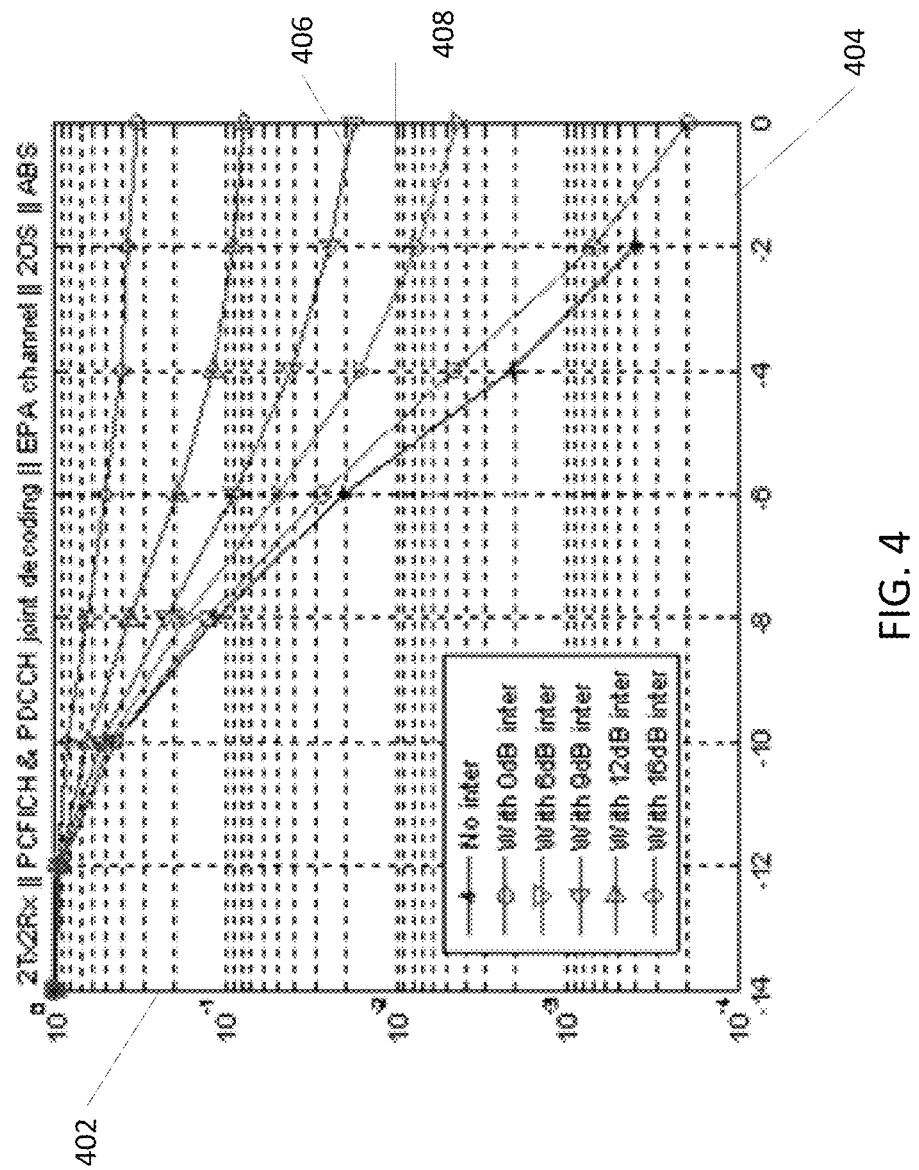
FIG. 4 illustrates by example, a diagram showing PDCCH block error rate (PDCCH BLER) (8 control channel elements (CCEs)) in presence of interference.

PDCCH performance is important for the overall system performance. FIG. 4 illustrates block error rate (BLER) for the PDCCH in presence of interference. The y-axis of the graph 402 represents the PDCCH BLER, whereas the x-axis of the graph 404 represents the SNR. The PDCCH, for example, may be configured for an aggregation level of 8. It can be seen that the presence of interference severely degrades the PDCCH performance, even when using the maximum aggregation level supported by LTE Rel. 10. More specifically, a 9 dB interference level (406) results in the PDCCH not reaching the $10^{-2}$ BLER performance requirement. The graph provides that a simple increase in the SNR may not be enough to bring the PDCCH BLER down to the desired operating region of $10^{-2}$, 408.

The physical layer control channel may be adapted as described herein to support a SuppCC for operation in LTE, LTE-A or LTE-like systems employing carrier aggregation. Although cross-carrier scheduling may be used to schedule resources in the SuppCC from PDCCH on the licensed band, PDCCH congestion may occur even for a small number of SuppCC. Therefore, in case of a potential PDCCH congestion, the system may support the transmission of PDCCH on the supplementary cell.

The eNB may selectively configure the supplementary cell with a control channel (PDCCH) during operation of the cell. The decision to configure PDCCH in the supplementary cell and entity in the radio resource management (RRM) may be referred to as the PDCCH manager. The PDCCH may be configured to resolve PDCCH congestion on the primary cell. A supplementary cell may be configured to transmit PDCCH, and each WTRU may be configured to use cross-carrier scheduling. The WTRU may be configured to read the PDCCH being transmitted on the supplementary cell.

The signaling for configuring cross-carrier scheduling may be done on a per-WTRU basis. This configuration/reconfiguration may include information about PDCCH through, for example, the CrossCarrierSchedulingConFIG. information element (IE). In LTE-A, the supplementary cell may be configured in various modes. The supplementary cell may be configured with a PDCCH, where the WTRUs may receive downlink allocations on the supplementary cell via the PDCCH. If, for example, at least one WTRU is configured to receive PDCCH on the supplementary cell, the PDCCH may require robustness enhancements to deal with interference in the LE bands. The supplementary cell may also be configured without PDCCH, where the WTRUs receiving downlink assignments for the current supplementary cell may be scheduled from the primary cell.

At the onset of operation, for example, in TVWS (e.g., when the RRM enables operation in LE bands, and activation of a SuppCC for a WTRU), the eNB may configure cross-carrier scheduling from the primary cell. During operation on the supplementary cells, the scheduler may monitor PDCCH congestion on the primary cell and determine whether PDCCH should be enabled on the supplementary cell(s). Based on the quality of each of the supplementary cells, the RRM may decide the supplementary cell(s) that may have PDCCH enabled.

Figure 5:
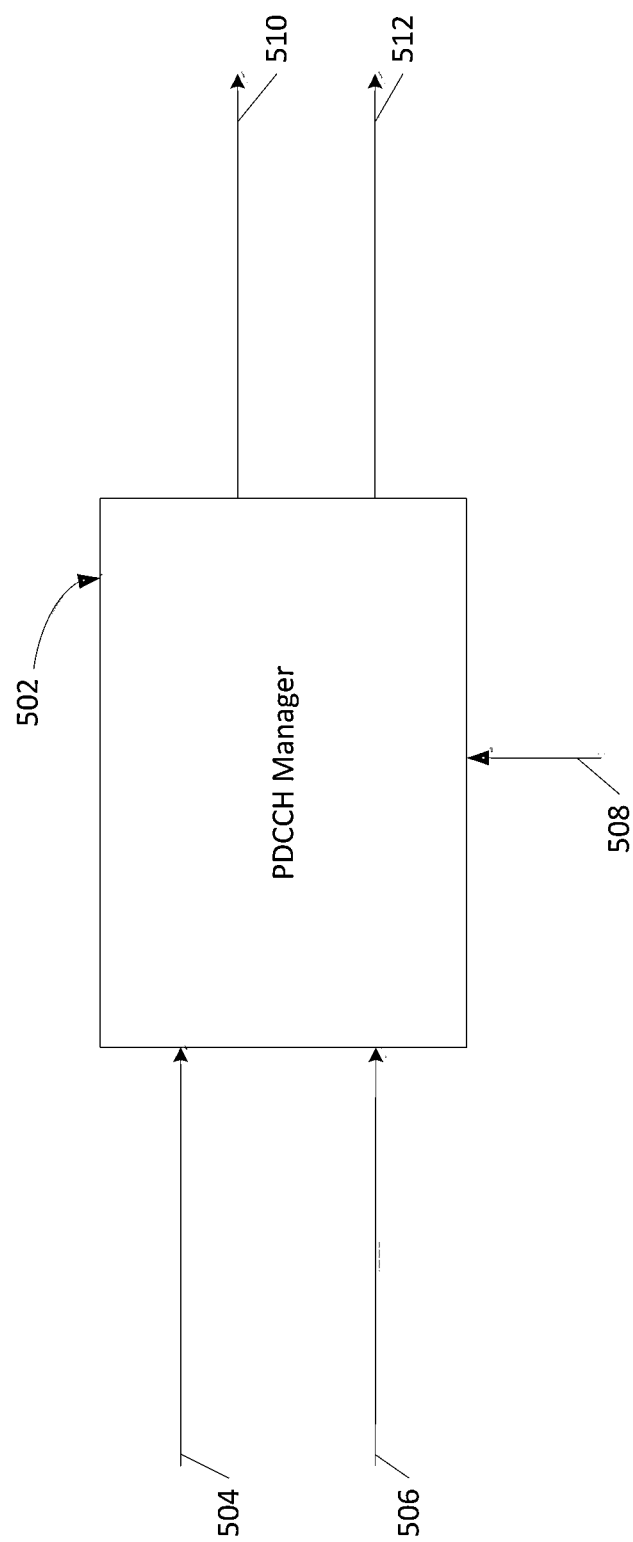
FIG. 5 illustrates by example, a depiction of a PDCCH Manager function block.

FIG. 5 illustrates the PDCCH manager function block. The PDCCH Manager in the RRM may be responsible for the determination of when to enable the PDCCH on the supplementary cell. The PDCCH Manager may also determine the WTRUs that may be configured to decode PDCCH on the supplementary cell or the WTRU's that may use the cross-carrier scheduling from the licensed band.

In addition, the PDCCH Manager may be responsible to determine when the extended aggregation levels on the PDCCH may be used, and for which WTRUs, the extended aggregation levels may be enabled.

As shown FIG. 5, the inputs to the PDCCH Manager Function block 502 may include: WTRU SuppCell Activation/Deactivation, 504, and PDCCH Congestion Data, 506. PDCCH Manager may be updated with the WTRU SuppCell Activation/Deactivation status, to be taken account in order to perform the PDCCH congestion resolution procedure. PDCCH Congestion Data may be an output from the Carrier Aggregation Scheduling block, and may include information about the SuppCell PDSCH resource blocks that may not able to be scheduled to WTRU due to the lack of PDCCH resource.

The PDCCH Manager may also be updated with the WTRU wideband Channel Quality Indication (CQI) measurement reports, 508 for the active SuppCells, in order to decide whether to enable the Extended Aggregation Level Mode for PDCCH.

The outputs from the PDCCH Manager Function block may include the PCell/SuppCell PDCCH Info, 510, and WTRU SuppCell Modify Req, 512. PDCCH manager may output the PDCCH configuration information on PCell, and each active SuppCell. The information may include the number of PDCCH symbols used, and the aggregation level (further including the information about the extended aggregation level, if used). The PDCCH manager may update the WTRU with the modified SuppCell configuration due to PDCCH changes, including the cross-carrier scheduling change, number of PDCCH symbols change, and the extended aggregation level information.

In an embodiment, configuring the PDCCH on the SuppCC may include: determining when PDCCH on the primary may be experiencing congestion, determining the WTRU(s) that may be configured to decode PDCCH on the SuppCC in the case congestion is detected, and determining when congestion may be relieved, and the WTRU(s) moved to cross-carrier scheduling.

Figure 6:
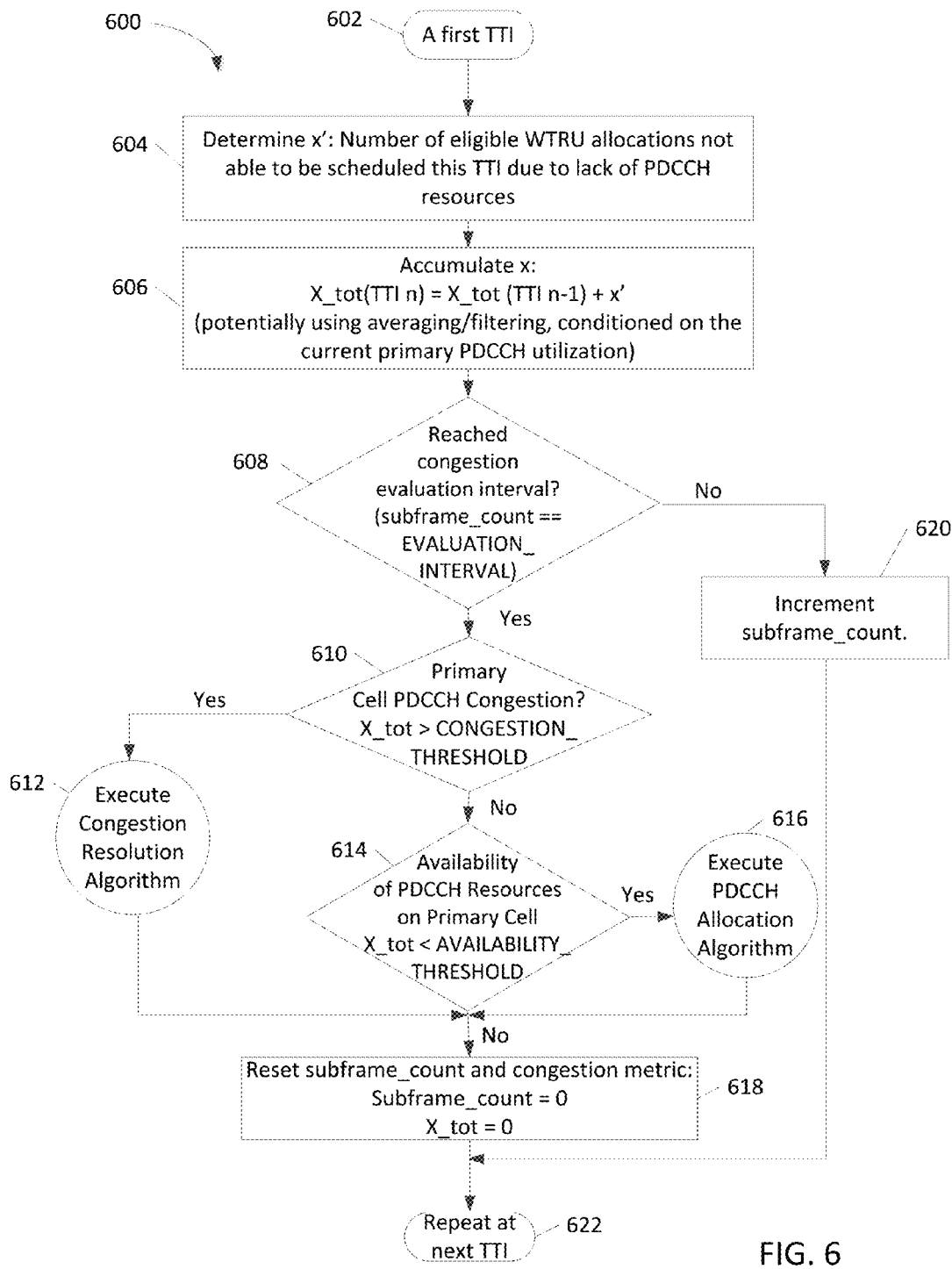
FIG. 6 illustrates by example, a flow diagram for PDCCH congestion determination.

FIG. 6 illustrates a flow diagram 600 of whether the primary cell PDCCH congestion has occurred. The determination of such condition may be made by finding the number of eligible WTRU allocations that may not be schedule because of unavailability of PDCCH resources, and then accumulating occurrence of such events. The congestion may for example be declared once PDCCH congestion crosses a predetermined congestion threshold. The method may be used independent of the number of WTRUs reading PDCCH on the supplementary. The method may be used to indicate that a first WTRU needs to read PDCCH from the supplementary cell, or that an Nth WTRU needs to read PDCCH from the supplementary cell. The metric used to determine congestion may include the number of "eligible" WTRU allocations (measured over a fixed number of frames or subframes) that cannot be scheduled from primary PDCCH due to unavailability of the PDCCH resources. The metric may be categorized by the current number of PDCCH resources. "Eligible" WTRU allocations may include allocations that the scheduler may be prepared to make, and may include allocations to WTRUs that may obtain PDSCH resources on one or more supplementary cells using cross-carrier scheduling from the primary cell. The accumulation algorithm and/or the threshold values may be conditioned on the current PDCCH utilization.

At 602, the PDCCH determination may be performed for each transmission time interval (TTI). At 604, the number of eligible WTRU allocations that may not be able to schedule the TTI due to lack of PDCCH resources may be determined. At 606, the number of occurrences of 602 may be accumulated. The accumulated number may be conditioned on the current primary PDCCH utilization. At 608, a determination of evaluation interval may be made. If the subframe count may not have reached the evaluation interval, the subframe count may be incremented at 620. Once the subframe count reaches the congestion evaluation interval, at 610, a determination may be made whether the primary cell PDCCH congestion has crossed the congestion threshold. If the primary cell PDCCH crosses the congestion threshold, at 612 the congestion resolution algorithm may be executed. At 618, the subframe count and congestion metric may be reset to zero, and the method may be repeated for next TTI at 622. If at 610, the primary cell PDCCH congestion may not have crossed the congestion threshold, at 614, a determination may be made for the availability of PDCCH resources on primary cell. If the availability is greater than a threshold value, at 616 PDCCH allocation algorithm may be executed, followed by resetting the subframe count and congestion metric to zero, and the method may be repeated for next TTI.

Figure 7:
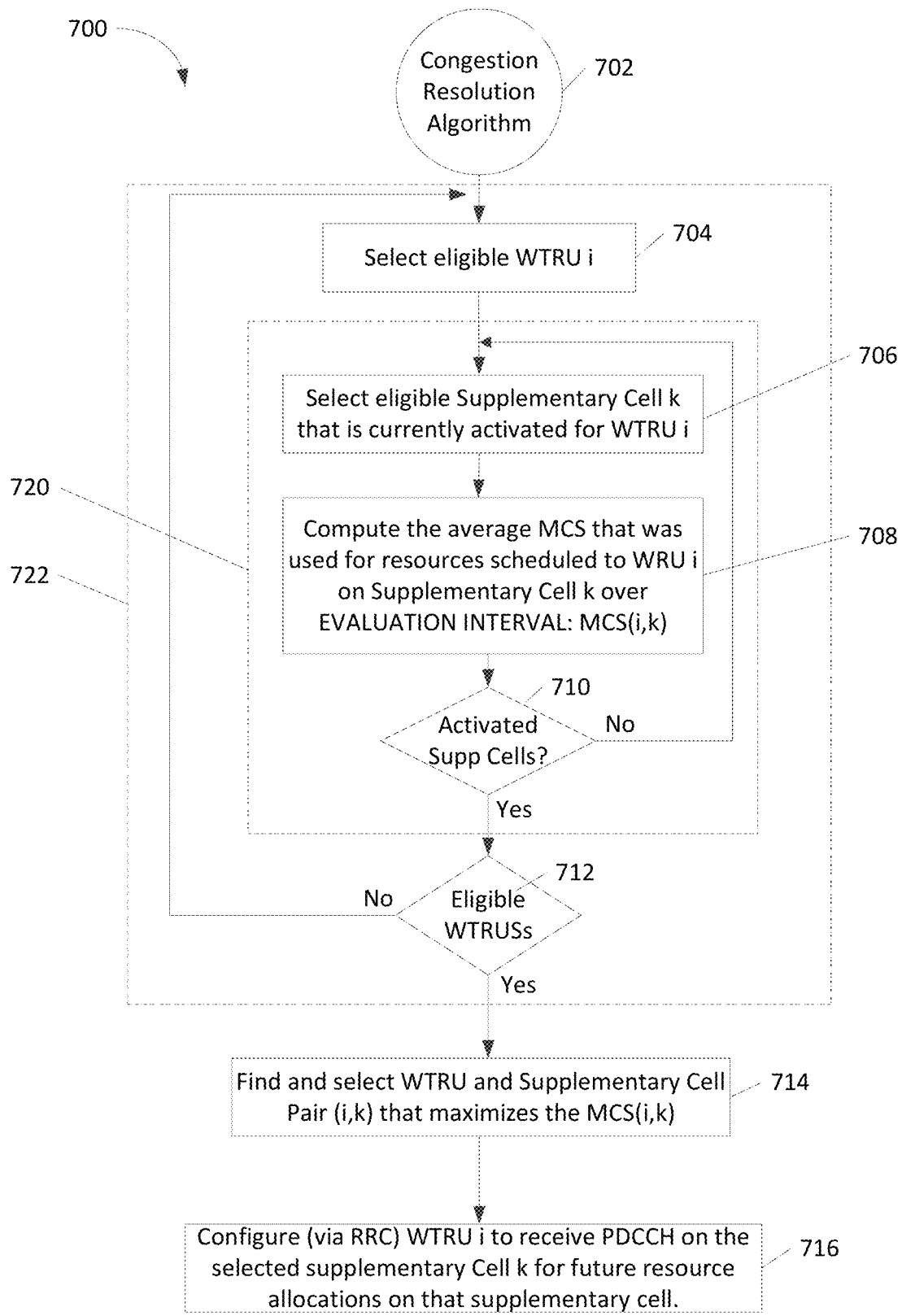
FIG. 7 illustrates by example, a flow diagram for a method of PDCCH congestion resolution.

Once PDCCH congestion has been determined, the RRM may configure an 'eligible' WTRU to receive PDCCH on the supplementary carrier (rather than relying on cross-carrier scheduling from the primary cell). FIG. 7 illustrates a flow diagram of the congestion resolution algorithm, 700 that may be executed by the PDCCH manager and may involve the selection of the WTRU. For the primary PDCCH allocation (e.g., selection of the WTRU to be moved back to the cross-carrier scheduling), WTRU with the worst average modulation and coding scheme (MCS) may be selected to be moved to cross-carrier scheduling, for example, as shown in FIG. 8.

In an embodiment, after the primary cell PDCCH congestion determination may be made at 610, and the threshold may be greater than the congestion threshold, the congestion resolution algorithm as illustrated in FIG. 7 at 700 may be run. The algorithm may start at 702. At 704, a WTRU eligible for the resolution algorithm may be selected. At 706, the eligible supplementary cell that is currently active for the selected WTRU may be selected. At 708, the average MCS used for resources scheduled to WTRU on supplementary cell may be computed. At 710, a determination may be made as to whether the supplementary cells corresponding to the current WTRU have been activated. The loop 720 may then be repeated for each supplementary cell that may be active for the current WTRU. In addition, the loop 722 may be repeated for each of the eligible WTRU. At 714, the WTRU and the corresponding supplementary cell that maximizes the MCS may be selected. At 716, the corresponding WTRU, via RRC, may receive PDCCH on the selected supplementary cell for future resource allocations on that supplementary cell.

Figure 8:
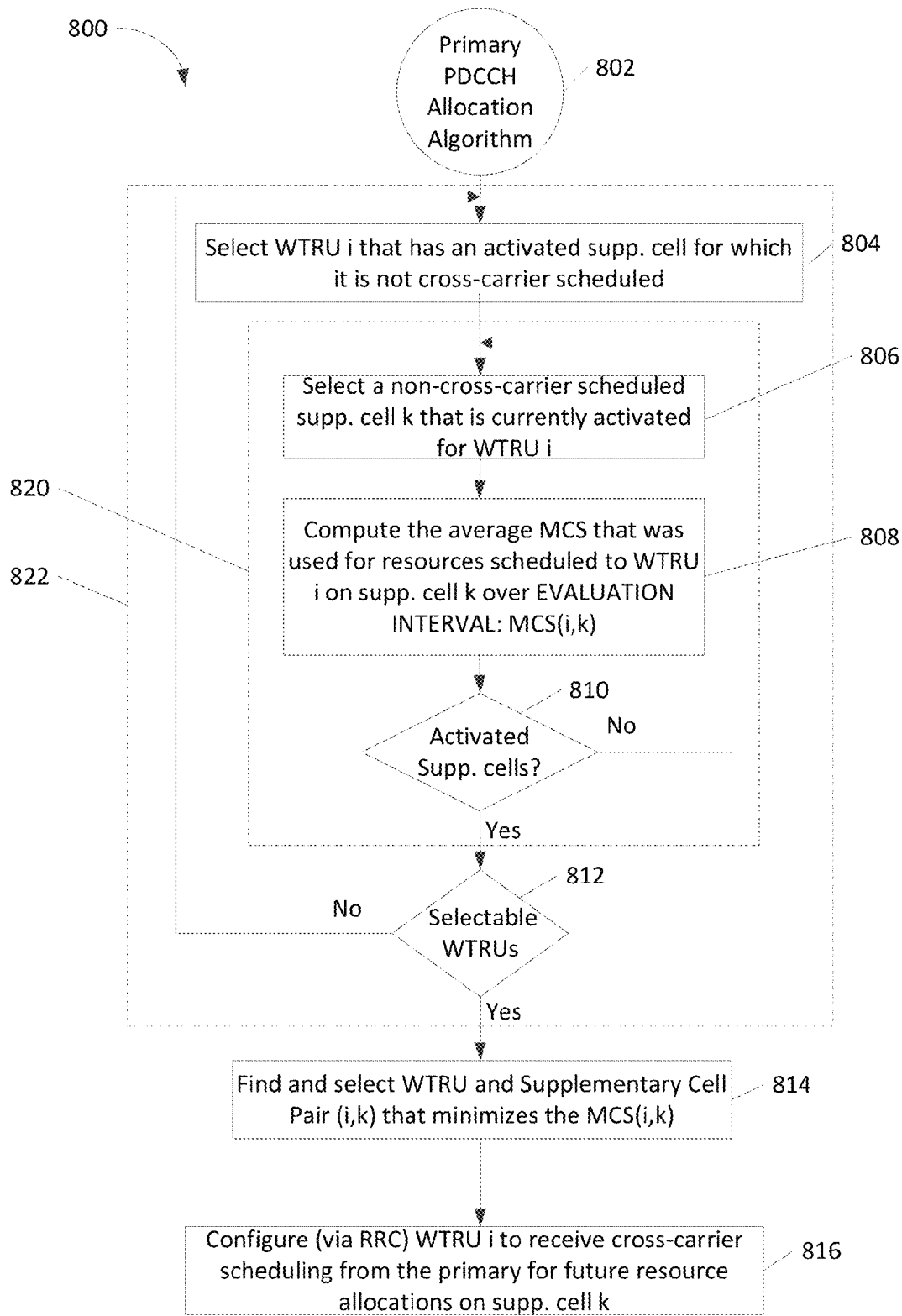
FIG. 8 illustrates by example a flow diagram for a Primary PDCCH Allocation.

FIG. 8. illustrates primary PDCCH allocation algorithm, 800. For example, after the determination may be made for the availability of PDCCH resources on primary cell at 614 of FIG. 6, and the availability is greater than a threshold value, the PDCCH allocation algorithm may be executed. The primary PDCCH allocation algorithm may start at 802. At 804, the eligible WTRU with activated supplementary cell with no cross-carrier scheduling may be selected. At 806, a non-cross carrier scheduled supplementary cell currently activated for the selected WTRU may be selected. At 808, the average MCS used for resources scheduled to WTRU on supplementary cell may be computed. At 810, a determination may be made whether the supplementary cells corresponding to the current WTRU have been activated. The loop 820 may be repeated for each supplementary cell that may be active for the current WTRU. In addition, the loop 722 may be repeated for each of the eligible WTRU. At 814, the WTRU and the corresponding supplementary cell that minimizes the MCS may be searched for and selected. At 816, the corresponding WTRU, via RRC, may then receive cross-carrier scheduling from the primary cell for any future resource allocations on a supplementary cell. The subframe count and congestion metric may be reset.

For a specific supplementary cell, when the first WTRU is selected to start receiving PDCCH from that supplementary cell, the remaining WTRUs may have the starting PDSCH location re-configured because, for example, the starting PDSCH may have been initially configured at OFDM symbol 0 (due to the supplementary cell using cross-carrier scheduling). The PDSCH location may be changed for the WTRUs to allow for PDCCH to be sent in the first 1-3 OFDM symbols.

In an embodiment, when the supplementary cell is allocated, WTRUs may be configured with PDSCH start of 0 so that the entire Supplementary Cell resources may be used for data. When the first WTRU needs to be reconfigured to start reading PDCCH on the supplementary cell, the affected WTRUs may receive a RRC reconfiguration notifying the WTRUs of the change of PDSCH start. A WTRU may be scheduled on the supplementary cell when it may receive and acknowledge the RRC reconfiguration signal. A Supplementary Cell first allocated with PDSCH start at symbol 0, and later requires configuration of PDCCH, may use the procedure.

In an embodiment, when the Supplementary Cell is first allocated, based on the number of WTRUs, the PDCCH manager may decide whether PDCCH congestion may arise in this scenario. The decision may be based on the number of WTRUs currently attached to an eNB, and the bandwidth of the primary cell. If the PDCCH manager determines that congestion may arise, the supplementary cell may be configured to have PDSCH start at OFDM symbol 3. The supplementary cell may be configured to have PDSCH start at OFDM symbol 0. For a supplementary cell configured with PDSCH start at symbol 3, when the first WTRU is moved to read PDCCH to the Supplementary Cell, the WTRUs may not be reconfigured as a result. However, during cross-carrier-scheduling-only mode for this cell, the first 3 OFDM symbols may be unused by the system In LE bands, search spaces may be tailored to the use of SuppCC. For a SuppCC, a flexible definition of search spaces may be employed. The LE bands may inherently be less reliable at certain time instants where interference from other secondary users may be present (e.g., using a different radio access technology (RAT)), or when an uncoordinated user may decide to use the same frequency. The propagation characteristics of the LE bands may vary considerably. For example, in the TVWS, the propagation characteristics from one end of the TVWS to the other may be different. In addition, power restrictions in the LE bands may be imposed on an eNB/HeNB when using a particular SuppCC. These power restrictions may come from coexistence measures or from a geolocation-based database of primary (or exclusive) users of the LE bands.

The number of search spaces in each aggregation level may be fixed. In addition, the number of search spaces may be biased towards the lower aggregation levels, as is shown in Table 1. In the presence of strong interference, the eNB/HeNB may require additional coding for the control channel, as power restrictions on the LE bands (such as the restriction of transmission at 40 mW on a channel adjacent to a DTV broadcast) may not make it possible to boost PDCCH power as in the case of licensed band operation. In addition, in LTE and/or LTE-A, robustness may be added to the control channel by favoring the increase of coding of PDCCH rather than the PDCCH power. In an embodiment, the number of search spaces and the allowable aggregation levels of each search space may be dynamically changed based on the state of the channel on which the SuppCC is being used. In doing so, additional PDCCH candidates at the higher aggregation levels may be used in order to provide the eNB with greater flexibility in cases where most of the control messages may need higher level coding.

In an embodiment, the number of PDCCH candidates to be decoded by the eNB may be increased to add new PDCCH candidates at higher aggregation levels. This may increase the number of blind decodings that a WTRU may perform in order to search for a PDCCH.

In an embodiment, the number of PDCCH candidates may remain relatively fixed using a scheme that may replace the PDCCH candidates at lower aggregation levels with PDCCH candidates at higher aggregation levels.

In an embodiment, during certain time periods, the eNB may take special measures to mitigate the impact of strong levels of interference. During these times, the eNB may enable a mode in which lower aggregation level candidates may be replaced with higher aggregation level candidates in order to increase control channel scheduling flexibility for high interference cases. This mode may be referred to as an Extended Aggregation Level Mode. When the scheduler may decide to use the Extended Aggregation Level Mode, the same may be signaled to the WTRUs, so that the WTRUs may modify their rules related to blind PDCCH decoding. The WTRU may perform blind decoding of PDCCH candidates under two different modes of operation. In normal mode, the current definition of the PDCCH candidates in LTE may be assumed and decoded by the WTRU. In Extended Aggregation Level Mode, when defining a total set of PDCCH candidates, the lower level candidates may be replaced by higher level candidates.

In an embodiment, multiple modes of operation may be defined, where moving to each mode may progressively add more PDCCH candidates to the higher aggregation levels by removing PDCCH candidates at the lower aggregation levels and keeping the number of WTRU blind decodings fixed.

In order to provide replacement of lower level PDCCH candidates with higher level PDCCH candidates with minimum impact on WTRU blind decoding, for each WTRU, the actual search space may be kept the same when moving from normal aggregation level mode to Extended Aggregation Level Mode. When moving to the Extended Aggregation Level Mode the overall search space for a given WTRU (e.g., the actual number of CCEs the WTRU may consider in its blind decoding) may remain the same. The CCEs may be grouped to form each PDCCH candidate may be different than provided by the normal aggregation level mode in the current version of LTE.

Figure 9:
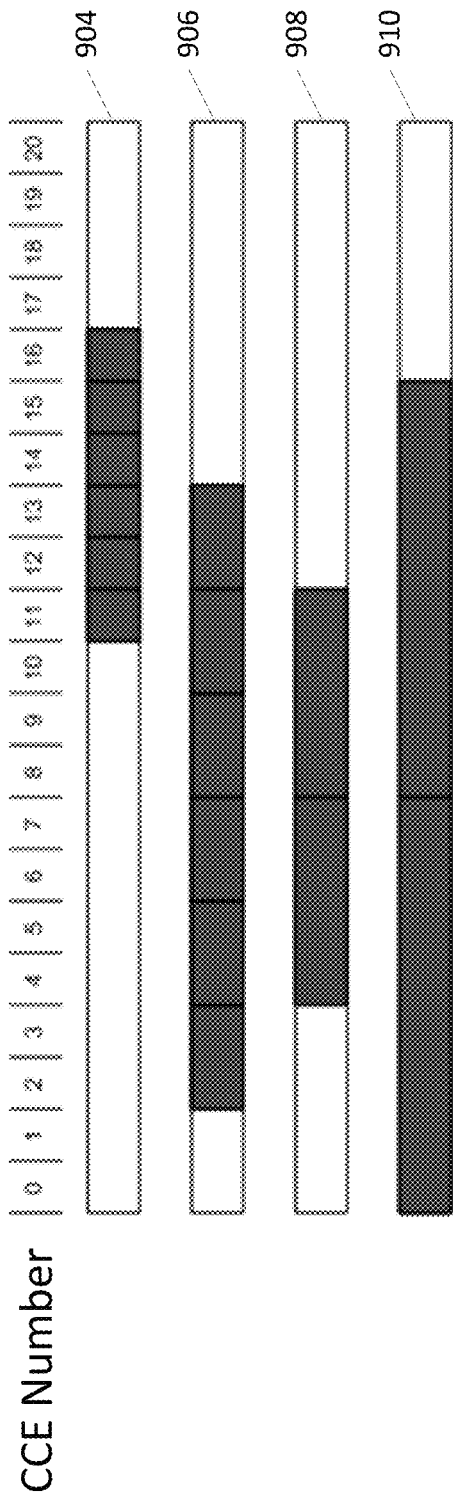
FIG. 9 illustrates by example, PDCCH candidates for "Normal Mode" LTE.

FIG. 9 illustrates PDCCH candidates for Normal Mode with various aggregation levels (L=1 at 904, L=2 at 906, L=4 at 908, and L=8 at 910). When a WTRU is in normal aggregation level mode, the PDCCH candidates (904-910) and their corresponding CCEs (902) may be determined, for example, as provided in the section 9.1.1 of 3GPP TS 36.213 v10.1.0.

Figure 10:
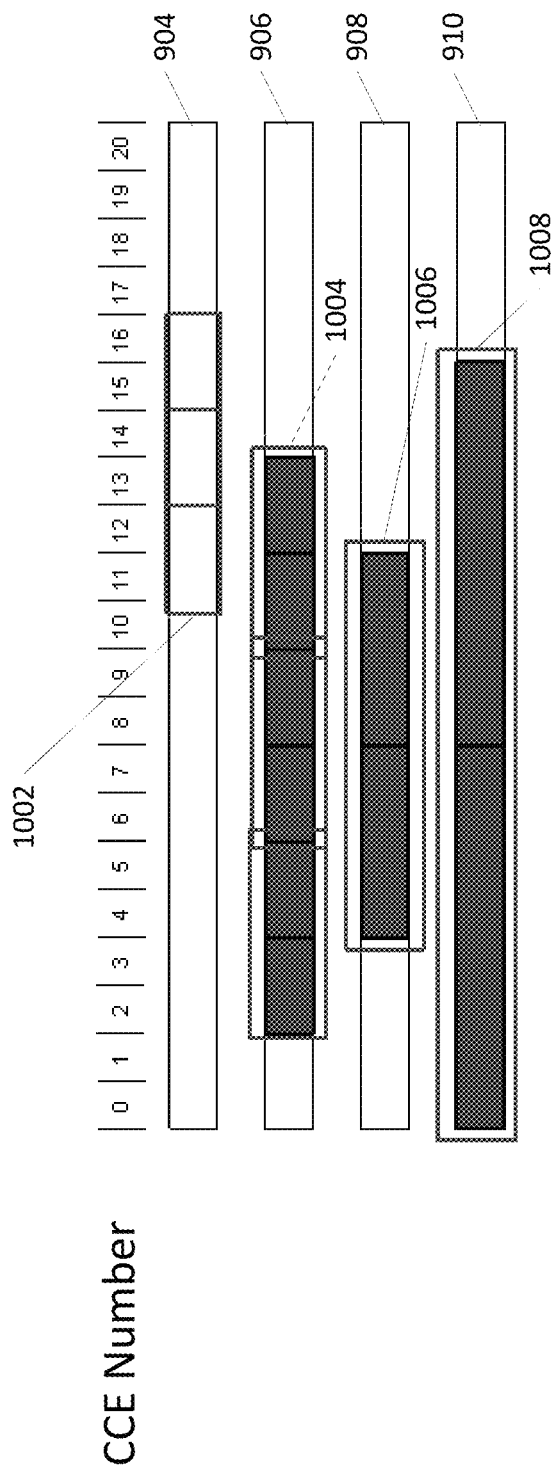
FIG. 10 illustrates by example, PDCCH candidates for "Extended Mode" LTE.

FIG. 10 illustrates PDCCH candidates for extended mode. The PDCCH candidates for a 5 MHz system and the resulting candidates 1004-1008 in the extended mode are shown. In the extended mode, the L=1 candidates (904) may be removed, and the candidates at L=2, 4, and 8 may be introduced (1002-1006). An L=16 (1008) candidate may be represented by a combination of the two L=8 candidates. The total number of CCEs may depend on the bandwidth and the number of PHICH resources.

In the extended mode, therefore, the two candidates at a given level L may be combined into a single candidate of level L+k (where L+k is the next aggregation level that is a power of 2). The aggregation technique may be applied to each of the LTE aggregation levels (L=1, 2, 4, and 8). This may not limit the use of this method to a subset of the aggregation levels, or to combining more than two candidates to create new candidates. For example, a new PDCCH candidate 2 aggregation levels above level L may be created by combining 4 PDCCH candidates at aggregation level L.

When a WTRU is in the Extended Aggregation Level Mode, the PDCCH candidates may be subdivided into two groups such as the base group, and the derived group.

The base group may be obtained by the equations and procedures, for example, as provided in the section 9.1.1 of 3GPP TS 36.213 v10.1.0, with the exception that aggregation level L=1 is ignored ($M^{(1)}$=0). The derived group may be obtained by using the following equation for the CCEs associated with a PDCCH candidate at aggregation level L:

$$\left(\left(L-\frac{L}{2}\right)\left\{(Y_k+2m')\bmod\left\lfloor N_{CCE,k}/\left(L-\frac{L}{2}\right)\right\rfloor\right\}+i\right)\bmod N_{CCE,k} \quad \text{Equation 3}$$

where L∈{2, 4, 8, 16}, and the number of PDCCH candidates in each aggregation level $M^{(L)}$ that may be used in the above equation may be as are provided in the Table 4.

TABLE 4

Derived Group of the Search space $S_k^{(L)}$ in Extended Mode

| Type | Aggregation level L | Size [in CCEs] | Number of PDCCH candidates $M^{(L)}$ |
|---|---|---|---|
| WTRU-specific | 2 | 6 | 3 |
| | 4 | 12 | 3 |
| | 8 | 8 | 1 |
| | 16 | 16 | 1 |

Once the base group and derived group of candidates have been identified, the WTRU may monitor the candidate in the base group and extended group at each aggregation level. The maximum total number of WTRU specific PDCCH candidates to be monitored at each aggregation level by a WTRU (with an extended mode search space) may be given by the Table 5. This total represents a maximum number, since, depending on the value of $Y_k$, there may be some overlap in the candidates from the base group and the derived group.

TABLE 5

Number of PDCCH Candidates

| Type | Aggregation level L | Size [in CCEs] | Number of PDCCH candidates $M^{(L)}$ |
|---|---|---|---|
| WTRU-specific | 2 | 18 | 9 |
| | 4 | 20 | 5 |
| | 8 | 24 | 3 |
| | 16 | 16 | 1 |

Figure 11:
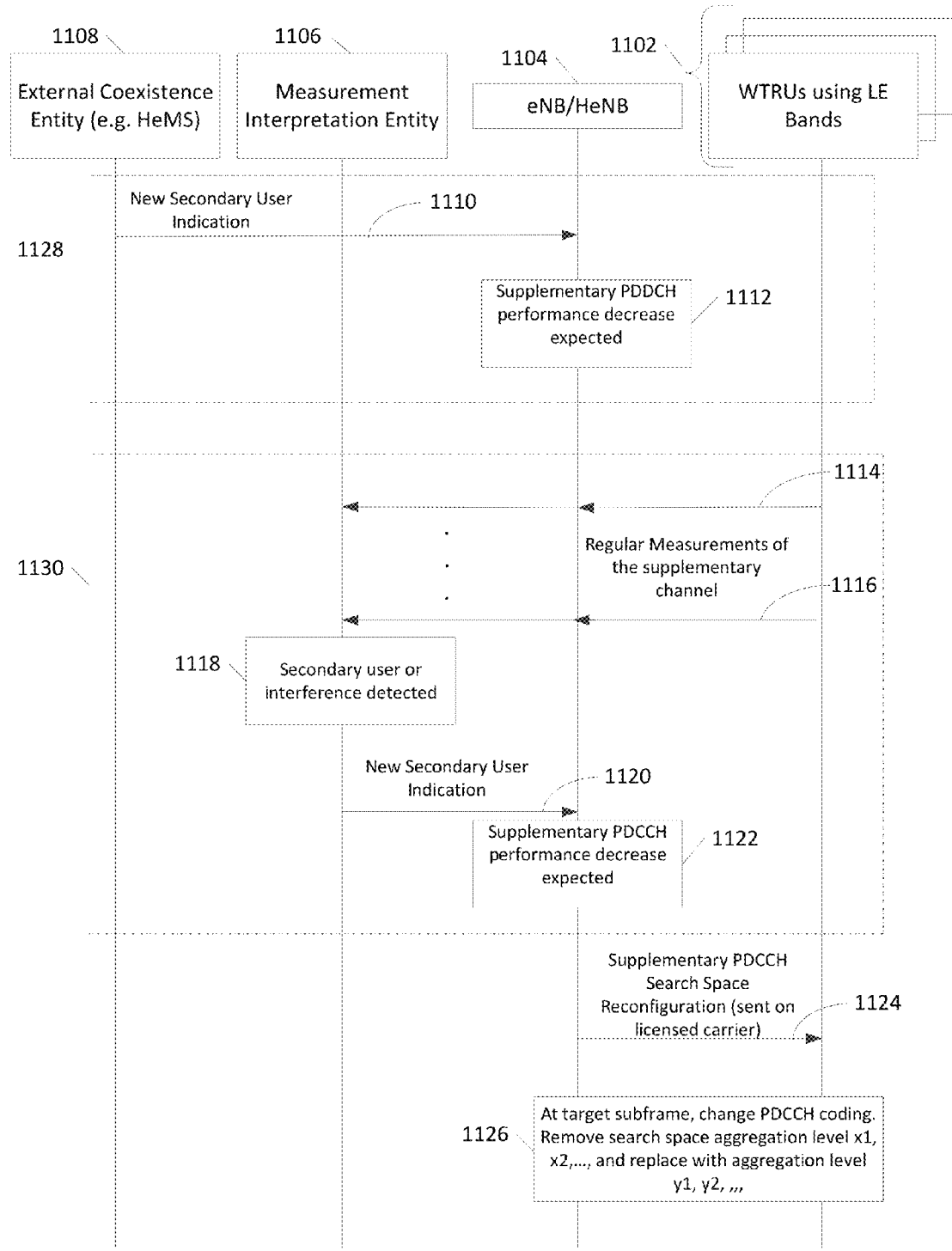
FIG. 11 illustrates by example, the information flow for dynamic search space reconfiguration in SuppCC.

FIG. 11 illustrates information flow for dynamic search-space reconfiguration in the SuppCC. The change in the aggregation level (or any similar change in the search space configuration, for the PDCCH to overcome interference) may be triggered by providing the eNB/HeNB with a message indicating the change in the channel quality due to the presence of a secondary user or some interference (1128 and 1130). The indication of the change in the channel quality may be indicated through an entity responsible for measurement interpretation (1106) or database access, such as the measurement and RRM engines of the eNB/HeNB (1104) itself, a DSM Engine, or an external management node (1108). As shown in FIG. 11, the indication of a new secondary user may be indicated via a signal 1110 to the eNB/HeNB. The indication may be provided through measurements performed by the eNB PHY layer itself, 1130. After detecting the presence of a secondary user or interference at 1118, by measuring the supplementary channel (1114 through 1116), the presence of the secondary user or the interference may be communicated to the eNB/HeNB via a user indication, 1120. At 1122, PDCCH performance decrease may be expected.

After detection of the secondary user or the interference by 1128 or 1130, a search space reconfiguration message 1124 may be sent by the eNB to the WTRU (for example, through the licensed band carrier) indicating that a change in the search space configuration may take place at a particular frame or subframe boundary. The change in configuration may be sent by system information, periodically sent to the WTRUs, for example, SIB in LTE, transmitted on the licensed band, and dedicated for the signaling of the search space configuration on the LE band.

The change in search space configuration signaled by the eNB may include the replacing aggregation level x with a higher order aggregation level y (1126) in order to be able to send the same DCI formats on the SuppCC with additional coding. The PHY layer may then reconfigure its convolution coding to use a different coding to increase the robustness of the DCI formats.

During the time where aggregation level mode change is pending for a given WTRU, the WTRU may continue to schedule and decode PDCCH on the supplementary cell as long as there are PDCCH candidates that may be common between the normal and extended modes. The presence of such common PDCCH candidates may depend on the subframe, the specific WTRU, and the equations and tables provided herein.

A specific WTRU may be scheduled following a transition from a normal aggregation level to extended aggregation level (or vice versa) by the eNB, and the eNB may use the common candidates to perform the scheduling during this time. Restriction to the use of common versus extended aggregation levels may be limited to the time the eNB may decide to change the aggregation level and the signaling may be received by the WTRU. The eNB may assume to use the "previous" aggregation method until the instant the signaling may be complete.

The WTRU may adapt to a wide range of supplementary channel quality without having to increase the maximum number of blind decodings. The WTRU may search for DCI formats in the aggregation levels that may be configured at the specific instant of time. The search spaces may be dynamically configured in such a way that the WTRU may be aware of the aggregation levels that may be configured at a given time. The WTRU may also be aware of the allowable code rate that may be applied to each DCI format when mapping it to a particular PDCCH candidate at a given aggregation level.

In an embodiment, the supplementary PDCCH search space reconfiguration message 1124 for an LTE system operating on a SuppCC may be sent through a MAC CE. The eNB may individually choose the WTRU that may have PDCCH search space reconfigured (or may change aggregation level mode). After selecting the target WTRU, the eNB may send a MAC CE to that WTRU, indicating the need to change the aggregation level mode and the subframe (implicitly or explicitly) in which the aggregation level mode change may take effect. As of the indicated subframe, the WTRU may perform blind decoding of PDCCH based on the Extended Aggregation Level Mode.

Figure 12:
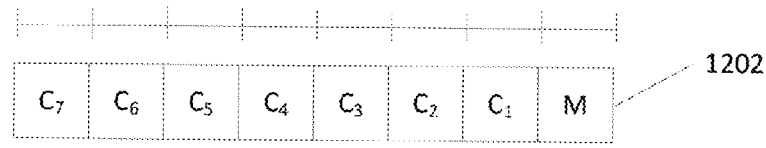
FIG. 12 illustrates by example, an aggregation level mode change medium access control-control element (MAC-CE).

FIG. 12 illustrates, by example, the MAC CE signaling. The eNB may use the MAC CE to indicate the change of aggregation level mode to a WTRU (from normal to extended and vice-versa). The change in aggregation level mode MAC CE may be identified by a MAC PDU subheader with LCID as shown in FIG. 12. The MAC-CE has a fixed size and consists of a single octet containing seven C-fields and one M-field (1202), as shown. Field Ci may indicate the mode change that may apply to the supplementary cell with SCellIndex i. The Ci field may be set to 1 to indicate that the SCell with SCellIndex i may have a mode change. The Ci field may be set to 0 to indicate that the SCell with SCellIndex i may not have a mode change. Field M may indicate the aggregation level mode. The M field set to 1 may indicate that the associated supplementary cells may be set to Extended Aggregation Level Mode. The M field set to 0 may indicate that the associated supplementary cells may be set to normal aggregation level mode.

Figure 13:
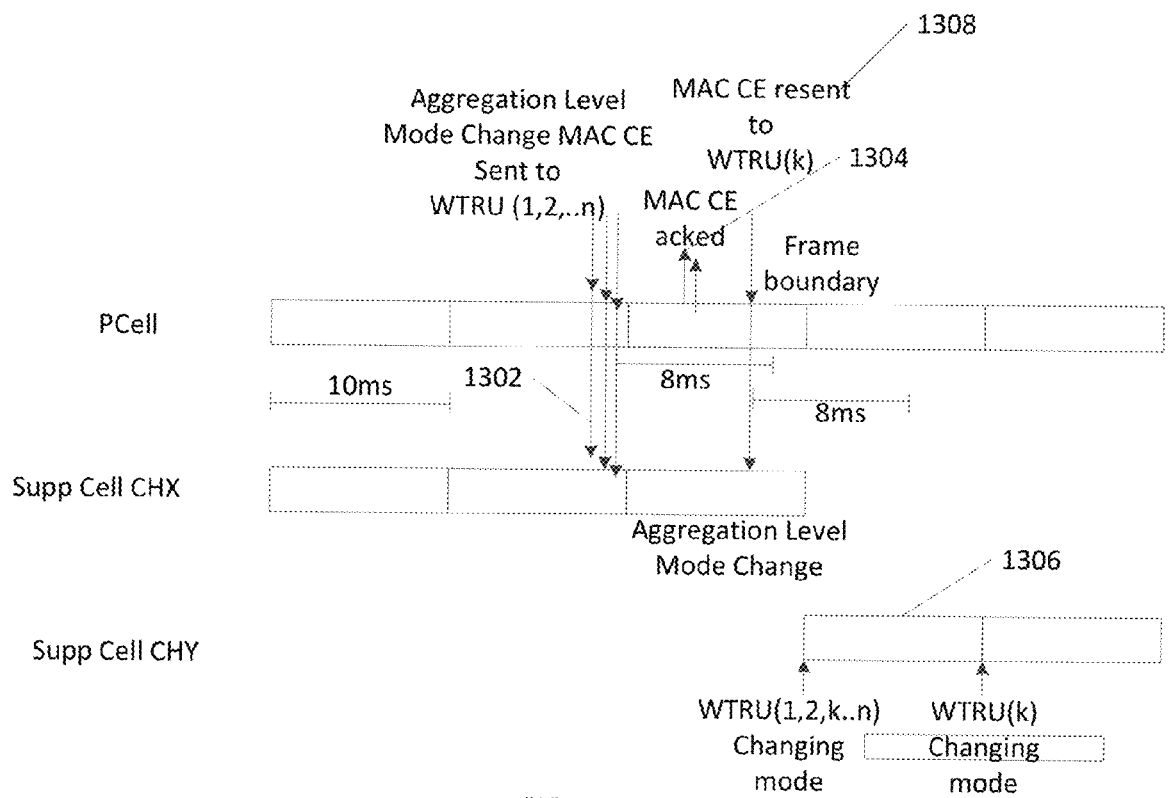
FIG. 13 illustrates by example, a change in aggregation level mode.

When a supplementary cell is first activated, the aggregation level for a WTRU may be normal. FIG. 13 illustrates change in aggregation level mode. At 1302, the WTRU may receive the aggregation level mode change MAC CE. At 1304, the WTRU may send an ACK to the received MAC CE. At 1306, WTRU may change its mode based on the received aggregation level mode change MAC CE signal. The aggregation level mode may be changed to extended mode through a MAC CE sent to that WTRU. The change in the aggregation level may occur n subframes following the reception of the aggregation level mode change MAC CE (1302) (assuming this MAC CE is properly acknowledged by the WTRU).

The change of aggregation level (1306) may occur at the first encountered frame boundary occurring 8 subframes after receiving the MAC CE (1302). In the event that the MAC CE may not be acknowledged by the WTRU, the eNB may resend the aggregation level MAC CE (1308). A MAC CE with the field M set to 0 may also be sent to resume back to normal aggregation level using the same procedure described previously. The use of MAC CE may allow the eNB to change the aggregation level for a WTRU quickly. The RRC signaling or system information may be used to change the aggregation level mode. In these cases, however, the eNB may send additional information about the change in search space configuration. For example, the search space may be redefined completely, with the RRC message of system information block (SIB) providing the aspects of the new search space configuration to be applied, following receipt of the message by the WTRU.

When PDCCH is being transmitted on the supplementary cell, the PDCCH manager may be responsible for determining when to enable and/or disable extended aggregation levels and the WTRUs for which the mode may be enabled and/or disabled. An LTE eNB may determine the coding and aggregation level to be used for the control channel based on the signal to interference plus noise ratio (SINR) obtained from wideband CQI measurements, which may be obtained from tables maintained in the RRM. The decision for determining when to enable and/or disable extended aggregation levels on supplementary cells may be provided. In order to make this decision, the eNB may add evaluation criteria for determining the WTRUs that may operate under the extended aggregation level. These evaluation criteria may be based on time averaged SINR and the number of CCEs used for transmitting a DCI message at the averaged SINR.

Figure 14:
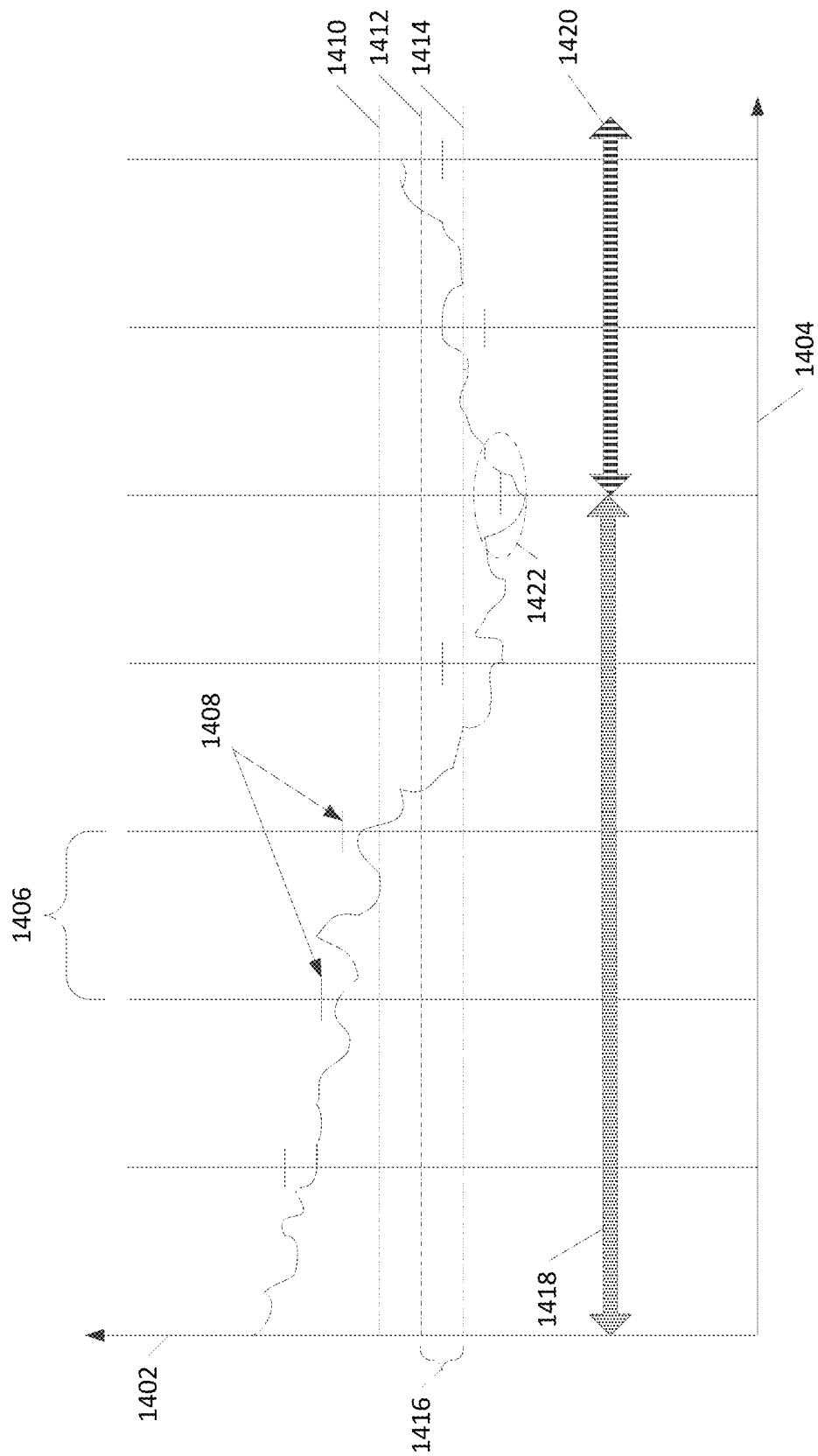
FIG. 14 illustrates by example, an aggregation level mode change algorithm.

FIG. 14 illustrates aggregation level mode change algorithm. FIG. 14 provides an exemplary plot of instantaneous control channel SINR 1402 for a WTRU A, for example, with time 1404. On the supplementary Cell, DCI format 1C may not be used, since it may be reserved for transmission of system information and random access channel (RACH) response. The smallest DCI format that may be transmitted on the supplementary cell may, for example, be DCI format 1A. Based on the SINR for a specific WTRU, the extended aggregation levels may be enabled when it is no longer possible to transmit DCI format 1A using a single CCE. In order to avoid frequent changes in the aggregation level mode for a WTRU (and the associated MAC CE messaging), the decision criteria may be conditioned on the SINR being a value of delta 1416 above (1410) or below (1414) the threshold SINR 1412 for transmitting DCI format 1A to using 2 CCEs.

For each WTRU and each Supplementary Cell with configured PDCCH for that WTRU with normal aggregation levels 1418, the eNB may measure an averaged SINR 1408 over a specific averaging interval 1406. This averaged SINR may be compared to the SINR threshold, the SINR in which DCI format 1A, for example, 2 CCEs, may be sent with minimal PDCCH BLER. When the averaged SINR drops delta below this threshold (as depicted at 1422), the eNB may configure extended aggregation levels 1420 for this WTRU using MAC signaling. When the averaged SINR then reaches to delta above the threshold 1410, the WTRU may be configured with normal aggregation mode.

In an embodiment, robustness may be added to the PDCCH through repetition of DCI messages within the same subframe. In this case, when the eNB becomes aware of a reduction in the channel quality of the SuppCC, or when missing ACK/NACKs have been detected, the eNB may repeat a DCI message "n" times within the PDCCH of the same subframe. To provide improved frequency diversity, the DCI messages may be spread in the frequency domain and may be sent at the same or different aggregation level (using the same or different coding rates and rate matching respectively).

In an embodiment, the ACK/NACK feedback provided by the WTRU may include an indication of the number of PDCCH repetitions, correctly decoded by the WTRU. Such mechanism may allow the eNB to better optimize the dynamic repetition rate at the expense of transmitting to the WTRU the actual repetition rate, at each subframe. The repetition rate may be communicated to the WTRU through the PDCCH message by augmenting the DCI format for allocations on the SuppCC, and including the actual repetition rate in the downlink allocation. The repetition rate may be changed by a MAC CE message sent to the WTRU.

The options for PDCCH repetition may include PDCCH repetition without transmission of repetition rate, when the repeated PDCCH messages may be used for redundancy and frequency diversity. The WTRU may decode PDCCH until it may find a single downlink allocation and stop. PDCCH repetition may include repetition with fast adaptation of repetition rate, when the WTRU may be provided with the current repetition rate (by a PDCCH field or informed of a change in the repetition rate by MAC CE), and the WTRU may try to decode as many PDCCH fields it can find. The number of PDCCH fields found may be communicated via an enhanced ACK/NACK message.

Figure 15:
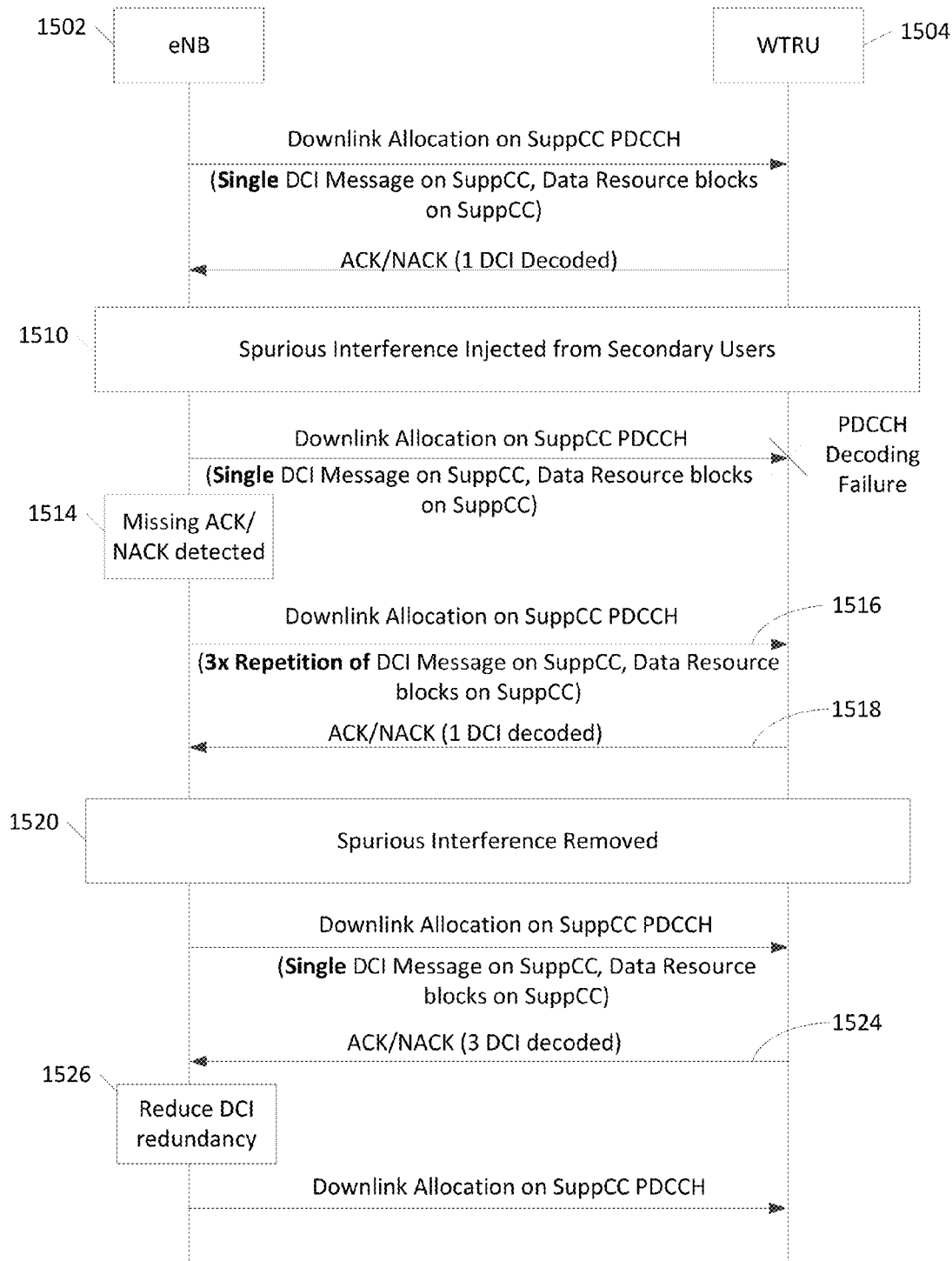
FIG. 15 illustrates by example, an information flow for PDCCH repetition with WTRU feedback.

FIG. 15 illustrates signal flow diagram of PDCCH repetition using ACK/NACK feedback as the metric to change the repetition rate. This metric may come from measurements performed at the eNB 1502. Based on lack of ACK/NACK received from a particular WTRU 1504, the missing ACK/NACK detected at 1514, after interference may be injected from the secondary users at 1510, the eNB may decide to increase the PDCCH repetition by sending each allocation message, for example, 3 times at 1516. The WTRU, in addition to sending ACK or NACK on the received data, may send, with the ACK/NACK message, the number repeated ACK/NACKs were received at 1518, and 1524. This feedback may be used by the eNB to indicate an improved channel in the LE bands, and remove interference at 1520. The eNB may decrease the number of PDCCH repetitions at 1526 to ensure efficient use of the SuppCC LE resources.

PDCCH repetition may benefit from an increased number of OFDM symbols used to transmit PDCCH as compared to regular LTE. Instead of transmitting PDCCH in, for example, a maximum of 3 OFDM symbols, the number of OFDM symbols for PDCCH on the SuppCC may be increased beyond 3, allowing for a greater number of search spaces and, therefore, a large potential for repetition for the eNB scheduler.

PDCCH congestion may be avoided by combining the scheduling information of multiple component carriers (such as primary and secondary or supplementary) using a single message. Such a combination may avoid using two separate control channel messages in order to allocate resources in both the supplementary and licensed carriers on the same subframe for the same WTRU. In addition, given that the SuppCC may be used during periods of high loading for the WTRU, the allocation of resources simultaneously on the licensed and LE carriers for a specific WTRU may frequently take place.

The resource allocations may be simultaneously made (in the same subframe) to the primary and/or secondary and supplementary component carrier. The allocations may be made in the licensed band (e.g., the resource allocation on the same subframe for primary and secondary or between secondary carriers).

Figure 16:
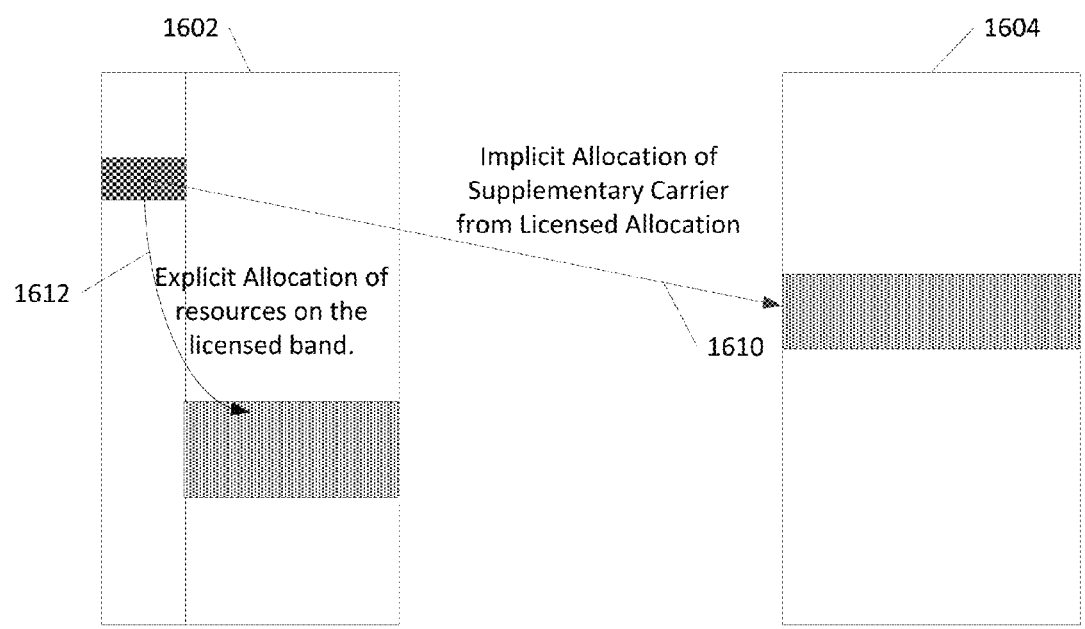
FIG. 16 illustrates by example, explicit allocation of resources on the licensed band and the implicit resource allocation of SuppCC from licensed allocation.

The allocation of resource blocks in the primary (or secondary) CC may be used to automatically and/or implicitly allocate resources on the SuppCC. FIG. 16 illustrates the implicit downlink resource allocation. A similar approach may be possible for an uplink allocation.

In order to be aware of the type of allocation, a resource assignment type may be defined that may perform explicit allocation 1612 of licensed band resources 1602, and implicit allocation 1610 of SuppCCs resources 1604. This allocation type may be referred to herein as a "type 3" allocation (this may also be generalized so that different allocation types may be used to do implicit allocation, as with LTE Type 0, 1, and 2). Similar design concept may be used in case of uplink grants.

Figure 17:
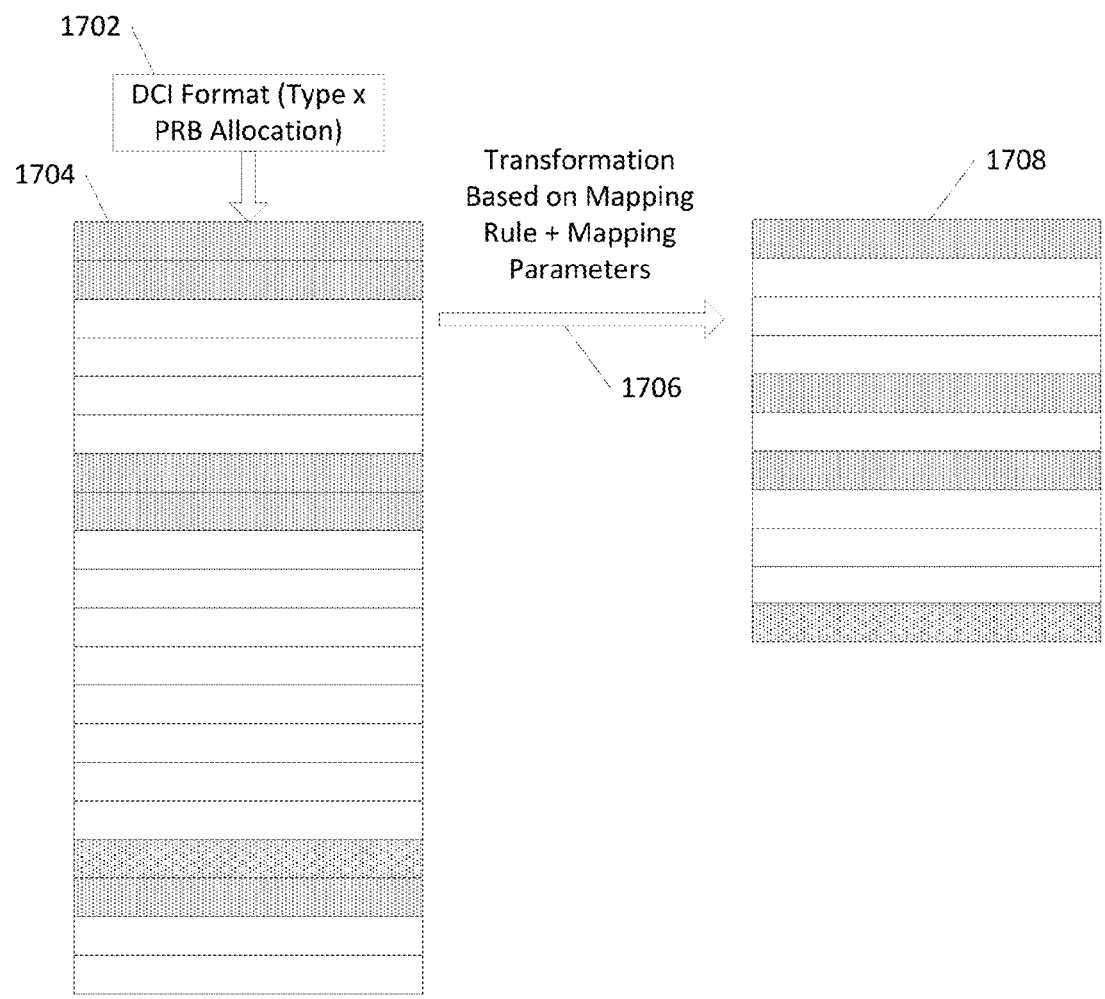
FIG. 17 illustrates by example, a mapping rule and mapping parameters in implicit resource allocation.

FIG. 17 illustrates mapping rule and mapping parameters, for example, in implicit resource allocation. In order to enable implicit allocation of one or more SuppCCs, the eNB and the WTRU that is receiving the allocation may be aware of a mapping rule that may map a PRB allocation on the licensed carrier (indicated by the CIF) to a related PRB allocation on one or more SuppCCs. Such a mapping rule may exist for each type of allocation (type 0, type 1, and type 2) that may normally be used to allocate resources on a PCC or SCC. As a result, when the eNB may send an allocation for a PCC or SCC using, for example, type 1 allocation, 1702, the WTRU may use the mapping rule applicable to type 1 to determine the PRBs that may have been implicitly allocated by the eNB on the SuppCC 1708. The eNB may then schedule resources for the WTRU based on the channel conditions of both the PCC/SCC 1704 and the SuppCC(s) 1708 using knowledge of the mapping rule (1706) that may provide the SuppCC resources.

A mapping rule can be very generic and not tied specifically to the allocation type, or may have close correlation to the allocation type used on the PCC/SCC. An embodiment of a mapping rule assuming a type 0 allocation may be the use of a bitmap subset. The eNB may assign to the WTRU on the SuppCC PRBs associated with the first N bits of the bitmap used in the type 0 allocation following the application of an offset O. For example, N and O may be the parameters for the mapping rule. For example, if the PCC contains 100 RBs, e.g., the first N=15 bits of the 100 bit bitmap may then be applied to PRBs of the SuppCC assuming an offset of, e.g., O=5. The resulting 15 bits may then select a set of PRBs in the SuppCC from the PRBs numbered, e.g., 5-19 (O–[N+O–1]). Another embodiment may have less correlation to the original allocation type, where, for example, type 2 allocation word may be split up into m different segments and each segment may be used as a bitmap for the allocation on each of the m active SuppCCs.

The mapping rule may be periodically communicated from the eNB to the WTRU in order to provide flexibility of the allocation based on the environment. For example, an increase in the WTRU traffic requirements may require the change in the mapping rule or parameters associated with the mapping. Such a change in mapping may be achieved through RRC signaling or via a MAC CE. In addition, the same mapping rule may be used for the WTRUs employing the LE bands, where the mapping rule, and the parameters, may be sent through system information on the licensed band.

A downlink allocation on a specific CC may specify the HARQ information to be used (including, for example, HARQ process number, new data indicator (NDI) and redundancy version (RV)). The HARQ information for the SuppCC may be transmitted in a number of ways. In an embodiment, a DCI format may be used to send separate HARQ information (HARQ process number, NDI, and RV)) for both the licensed band and licensed exempt bands. DCI Format 2 (used for MIMO), and defined with separate HARQ information for two different transport blocks may be used. In an embodiment, a DCI Format 2 may be used by sending separate transport blocks over allocations made on the licensed and licensed exempt carriers.

In an embodiment, the same HARQ process number may be used between the licensed and licensed exempt allocations. For example, the scheduler may use same process number for allocations for multiple carriers (PCC/SCC and SuppCC). If, for example, a retransmission is scheduled on the SuppCC, this retransmission may be performed by a type 0, 1, or 2 adaptive retransmission, until the next time when the scheduler may reuse the same process number between the two carriers.

PDCCH congestion may be resolved via repeated burst allocation and/or grant signaling. For example, a single PDCCH message may be used to allocate a burst of downlink or uplink resources that may occur on subsequent subframes. Such resources may repeat with a specific periodicity based on the current needs of the WTRU as determined by the scheduler. Semi-persistent scheduling (SPS) is allowed in primary cell. Repeated burst allocation, distinct from the SPS may be allowed.

SPS configuration may be moved out of the RRC and into the MAC layer so that the MAC scheduler may modify the scheduling interval based on the traffic for a specific WTRU as seen by the MAC. Using the MAC layer may give the scheduler the flexibility to configure SPS based on the current load conditions and potential blocking issues on the PDCCH, if necessary. It may allow the scheduler the ability to schedule resources for a time interval. The duration may be the allotted time in which the LTE system may be guaranteed to use the channel, based on certain coexistence rules or agreements.

Further, SPS may not allow the assignment of allocation for a number of consecutive subframes and may be configured with a minimum interval of 10 subframes (with the possibility of scheduling two subframes in the same frame for TDD). In order to allow the SuppCC to be scheduled with a smaller interval, a more flexible way of specifying the SPS interval may be provided.

In the repeated burst allocation, a MAC CE may be used to configure the burst mode on a per WTRU basis. The configuration of the burst mode may include an unique identifier that may identify the burst allocation; the number of consecutive subframes where an allocation may be present for the WTRU on the SuppCC; the periodicity of the burst allocation; and/or the hoping scheme being used.

In case of dynamic FDD, consecutive subframes as per the allocation may equate to consecutive subframes in time. For TDD, a special mode may be included in the MAC CE to determine whether the allocation may be made for downlink (where the consecutive subframes may consist of consecutive downlink subframes) or both downlink and uplink (where the number of consecutive subframes may consist of both DL and UL subframes depending on the TDD UL/DL configuration.

When hopping may be used, the allocation may move from one set of resource blocks to another or from one SuppCC to another within the burst time. The hopping mode may select, whether hopping may be limited to a change of resource blocks within a single SuppCC, or may be performed from one SuppCC configured for the WTRU to another.

At any given time when a burst mode allocation is active for a WTRU, the eNB may change the configuration of the burst mode by sending an updated MAC CE to change the above configuration parameters. The burst may be scheduled by the eNB based on known availability of the LE channel at a particular time. Knowledge of the availability may be obtained through coexistence decisions made by a coexistence system, by sensing results that may predict the availability pattern of the channel, or by an agreement with the primary user of the channel that may allow the use of LE channel for a particular period of time.

The start of a burst mode allocation may be triggered by a PDCCH message addressed to the RNTI that may correspond to the unique identifier sent in the MAC CE. This gives the resource allocation for each subframe of the burst. If the burst mode allocation is configured for consecutive subframes that are both downlink and uplink (e.g., for TDD SuppCC), the same resource block allocation may be used in both uplink and downlink modes.

Figure 18:
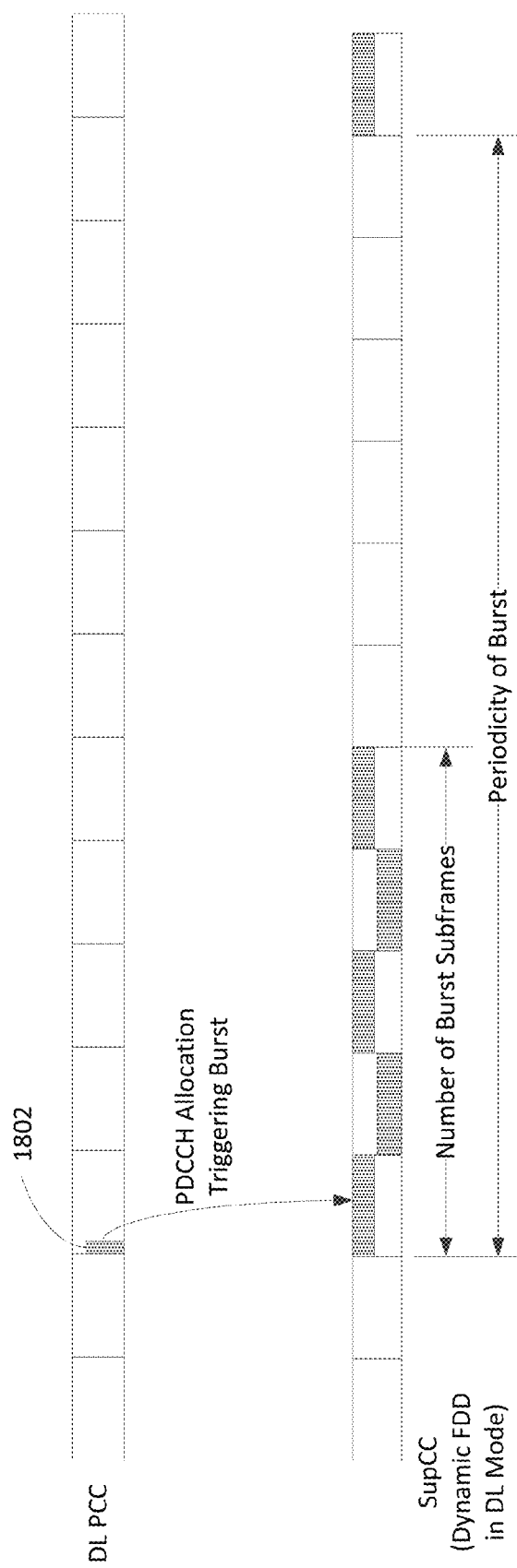
FIG. 18 illustrates by example, uplink grants and downlink allocations through data-embedded PDCCH.

FIG. 18 illustrates a burst mode allocation on the SuppCC cross-carrier scheduled from the licensed band. At the arrival of a coexistence gap or a mode change (UL to DL in the case of dynamic FDD), the active burst allocations may be implicitly cancelled. Cancellation of a burst may be achieved through transmission of special PDCCH allocation burst 1802 that may cancel the burst allocation, as with SPS in LTE.

LE bands may pose additional challenges to resource allocation based systems such as LTE due to the presence of interference and the need to coexist with other technologies. Coexistence with other technologies, for example, Wi-Fi and other LTE systems (e.g., managed by different operators) may be achieved through coexistence gaps, or periods where the resource allocation based system may allow other coexisting systems to access the LE channels. Due to presence of coexistence gaps in the transmission on the LE band, and sensing performed prior to transmission to determine the availability of the LE channel, it may be desirable to enhance the allocation and grant procedures described herein may be provided.

Figure 19A:
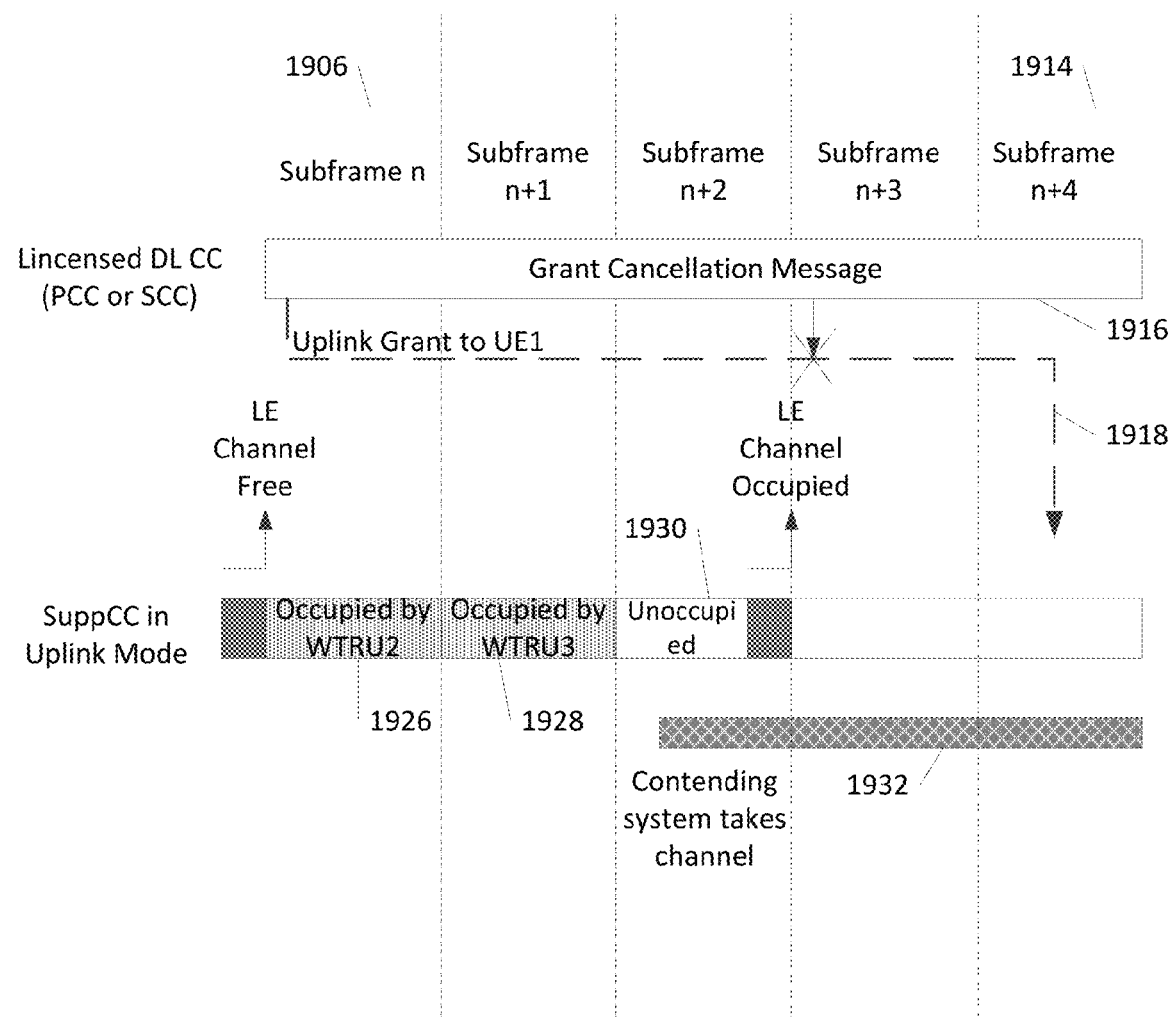
FIGS. 19A and 19B illustrate by example, timing of grant cancellation message without channel timing offset, and with channel timing offset.
Figure 19B:
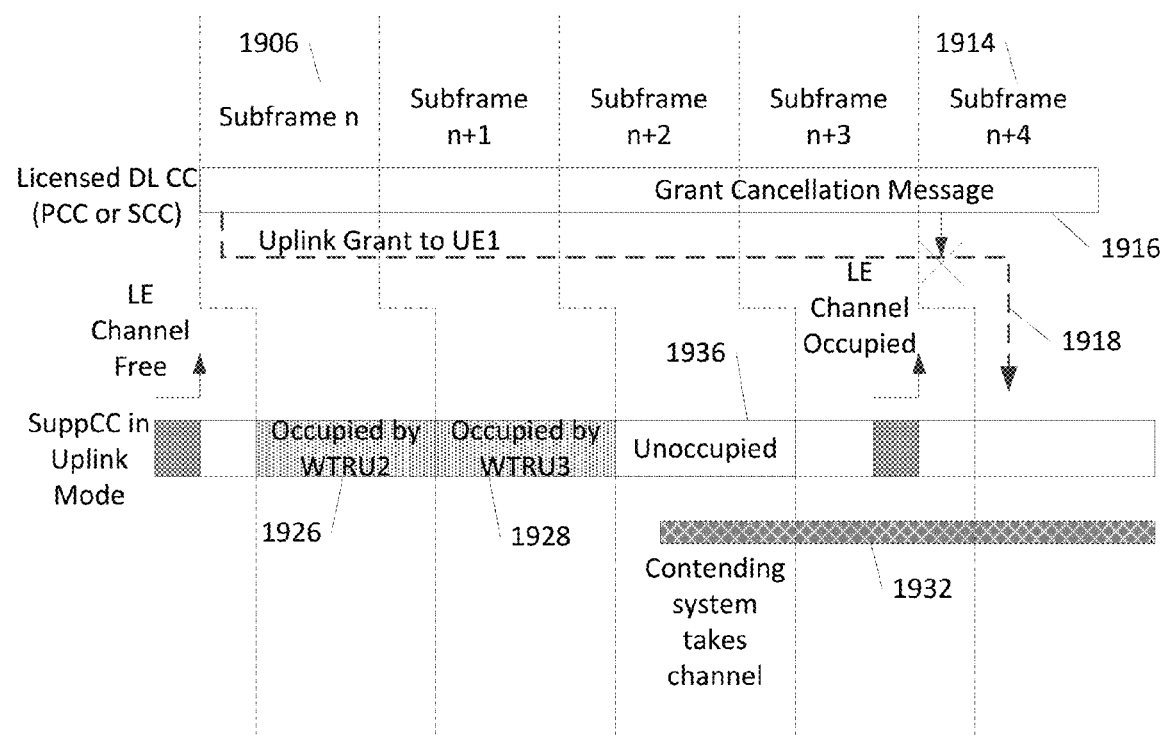

FIGS. 19A and 19B illustrate timing of grant cancellation messages in case of no channel timing offset, and with channel timing offset. An uplink grant signaled at subframe n 1906 to a WTRU 1918 may take effect after a certain number of subframes (e.g., 4 subframes in the case of FDD LTE (at 1914)). Since the LE channel may become unavailable following this delay, methods for coordination between the eNB and the WTRU may be provided in order to further validate or modify an uplink grant.

In an embodiment, it may be assumed that sensing on the LE bands to determine channel availability may be done at the eNB. In this case, the eNB may detect, at any time between the sending of the grant and the subframe where the grant takes effect, that the allocated LE channel may have become unavailable (as shown in, e.g., 1926 and 1928). This could occur, for instance, during an uplink subframe where the eNB may not have scheduled any uplink transmissions on the LE bands, and the unoccupied channel 1930 may then be taken by another contending system 1932. The eNB may become aware of this through a sensing operation that may be performed following the subframe that was not allocated to any user. In an embodiment, when the probability that a contending system may gain access to the LE channel is low, the eNB may send a grant cancellation 1916 indication to the WTRU via the licensed band (PCC or SCC). The grant cancellation may be sent on any subframe prior to the subframe 1914 where the uplink grant for the WTRU may take effect (1918). Further, assuming a time offset between the LE bands and the licensed bands (as shown in FIG. 19B), the grant cancellation 1916 may be sent on the same subframe 1914.

The grant cancellation message may be sent via a short control message on the PDCCH using, for example, format 1C. If the WTRU has been allocated data on the PDSCH of the licensed band, the grant cancellation message may be piggy-backed with the data allocation, thereby providing savings in the PDCCH. With a piggybacked grant cancellation, this information may be encoded robustly. In the case where a grant cancellation message may be sent at a specific time relative to the actual grant, the presence of this message may be sufficient for the WTRU to know that the grant may have been cancelled. The grant cancellation message may be reliably transmitted through the presence or absence of transmission on a specific OFDM symbol, or through the use of a different encoding in the data or CRC value used by the eNB on the PDCCH.

Following the reception of a grant cancellation message, the WTRU may abstain from transmission on the SuppCC for the subframe that may be allocated and may start transmission when it may receive future grants from the eNB.

A grant cancellation mechanism may be beneficial in the case of a system operating on a channel, where the system may be guaranteed temporary exclusive rights to operate, or the use by other secondary systems may be very low. Such a grant cancellation may allow protection against interference or other secondary systems without a large amount of signaling overhead. In case where a contending system may often access the channel, the mechanism of uplink grant cancellation may result in unnecessary signaling in the PDCCH due to the need to cancel an uplink grant and re-issue a new one. An uplink grant confirmation procedure may be used whereby the eNB may first send the uplink grant to a WTRU, and then confirm the availability of the LE channel by sending an uplink confirmation using the PDCCH of the PCC or SCC. When a grant confirmation may be sent by the eNB for subframe k, the WTRU may use the uplink grant that was allocated for it in subframe k. If an uplink grant confirmation is not received in subframe k, or the eNB sends an uplink grant cancellation for the WTRU in subframe k, the WTRU may not transmit on the LE bands in that subframe and may wait for the subframe containing the next uplink grant confirmation.

The eNB and corresponding WTRUs may move from one mode of operation, where grant cancellation may be transmitted, to another mode, where grant confirmation may be transmitted dynamically while operating on a LE channel. This change in mode may be triggered by an event, where new information may be available in a database of primary users or secondary users employing the same channel such as a coexistence database. The change may be triggered by a decision made by the eNB or an entity external to the eNB responsible for making measurements of the channel occupancy by other secondary systems. Such an entity may include a sensing toolbox.

The eNB may change from grant cancellation mode to grant confirmation mode when the sensing toolbox may become aware of increased secondary user utilization on the same LE channel. In this case, a threshold of secondary user utilization may be determined and a switch from one mode of operation may be enacted when the measured secondary user utilization may exceed this threshold. This decision may be performed at the sensing toolbox, or at the eNB itself using measurements from the sensing toolbox.

Prior to having a change of mode become effective in the system, the eNB may notify LE WTRUs using the channel. In an embodiment, the notification may be sent through dedicated system information associated with each supplementary cell operating in the LE bands, or each LE channel the system may use. In the case of supplementary cell system information, the dedicate SIB associated with the system information of each supplementary cell may contain a field such as "uplink grant mode" that may indicate whether uplink grant confirmation or uplink grant cancellation may be used on that cell. The supplementary cell uplink grant mode may be changed (following one of the triggers mentioned above) by a normal SIB change as defined in LTE.

The uplink grant confirmation may be defined within the PDCCH on the licensed band using CCE that may be reserved specifically for this message (similar design may be used for grant cancellation message). For example, one or more CCEs may be defined and reserved within the PCC PDCCH for transmission of uplink grant confirmations associated with a specific subframe to the WTRUs that may be registered to use the LE bands. Since multiple WTRUs may be simultaneously using the same SuppCC for uplink transmission (e.g. WTRU1 may be allocated a set of resource blocks in range f1, and WTRU2 may be allocated a set of resource blocks in range f2), multiple WTRUs may share the same uplink grant confirmation as this information may be based on the same sensing result obtained at the eNB.

Figure 20:
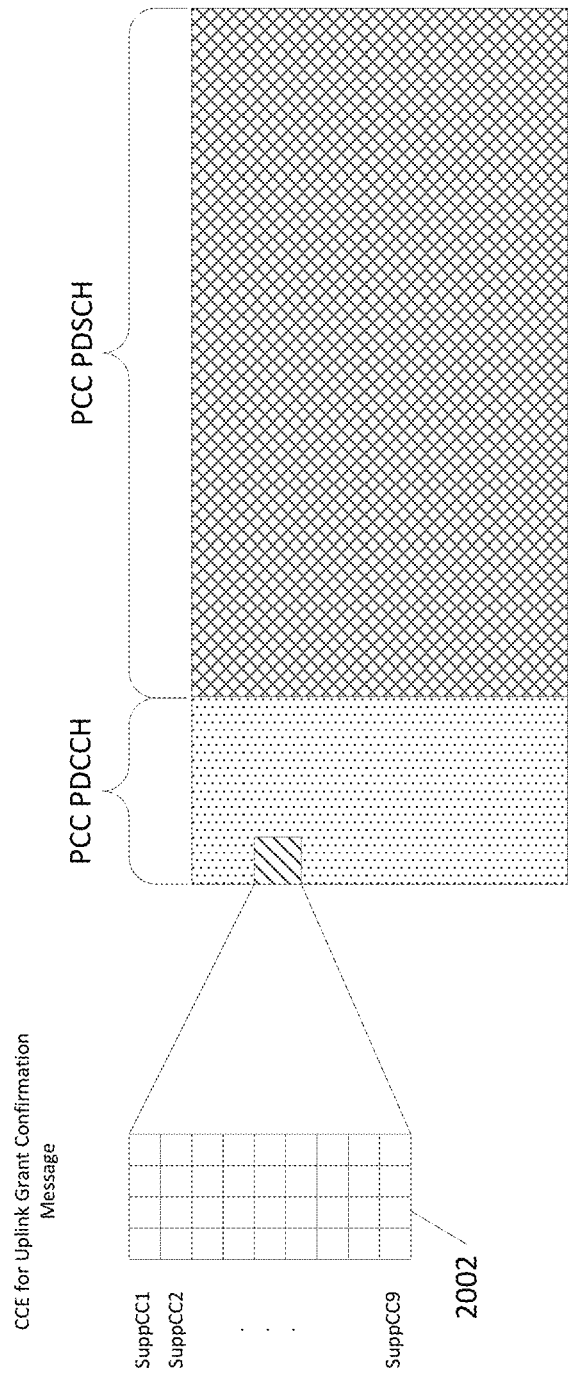
FIG. 20 illustrates by example, the use of CCEs for uplink grant confirmation message.

FIG. 20 illustrates the use of a single CCE on the PCC reserved for transmission of the uplink grant confirmations, where a single resource element group (4 resource elements) 2002 may be associated to a single SuppCC operating in uplink mode. A total of, for example, 9 SuppCC may be supported. As shown in FIG. 20, the number of resource elements associated with a single uplink grant confirmation may vary, and the value of, e.g., 4 may be selected. In the case of grant cancellation, for example, when the eNB determines that a given LE channel is busy, it may send the grant cancellation message by asserting the resource elements associated with the SuppCC operating in that LE channel. This grant cancellation message may be sent to the WTRUs that may have a pending grant on that SuppCC. WTRUs that may have a pending grant on that SuppCC may then decode the reserved CCE on a subframe prior to the actual grant.

The location of the reserved CCE for Uplink Grant Confirmation may be sent through system information to the LE capable WTRUs, or it may follow a predefined location and hopping pattern based on the SuppCC Cell ID. In either case, the LE capable WTRUs that may use the PCC may be aware of the location of the uplink grant confirmation (cancellation) message within the PDCCH. For some WTRUs, for example LTW Rel. 10 WTRUs, the reserved CCEs may not be used for sending control messages on the PDCCH.

When a WTRU may receive an uplink grant cancellation (or the absence of an uplink grant confirmation), the grant may remain pending until one of the following events may occur. The WTRU may receive a positive uplink grant confirmation in a future subframe. The WTRU may apply the uplink grant parameters (bandwidth (BW), modulation coding scheme (MCS), etc.) that may be sent on the future subframe. The WTRU may receive a new uplink grant in the PDCCH that may replace any pending grants for which the WTRU was awaiting an uplink grant confirmation. A timer on a specific uplink grant may expire without the eNB sending a grant confirmation or a new uplink grant in the PDCCH.

An uplink grant confirmation/cancellation may be sent in subframe n−k for a grant that may be valid in subframe n. This may allow the WTRU to determine mapping between the cancellation/confirmation, and the grants, when multiple uplink grants may be pending.

When sensing is performed at the WTRU, the WTRU may transmit in the grant it may have been allocated, after the WTRU has sensed that the channel is free. In this case, a grant may remain pending with the same grant parameters (BW, MCS, etc.) until the WTRU may be able to access the channel. The uplink grant may be enhanced to include a 'retry delay' parameter, that may indicate the number of subframes that a WTRU may wait before it may retry sensing and uplink transmission on the SuppCC, indicated by the UL grant. This retry delay parameter may be set by the scheduler at the eNB in order to maintain a full pipeline of UL transmissions by multiple WTRUs on the SuppCC at different times. It may also be set accordingly to account for a known access time of the contending system, if the information is known.

In order for the scheduler to make efficient use of an uplink SuppCC through the allocation of a retry delay parameter, the knowledge of whether a WTRU may be able to access the channel on a given subframe associated to a grant may be communicated to the eNB through a logical feedback channel. This information may be sent by the WTRU indicating that it successfully accessed the LE channel through the use of the control channel on the licensed band (similar to uplink control information (UCI) transmission made by the WTRU). The WTRU may transmit the uplink data on the LE using a specific encoding or CRC matching the one that was assigned to the WTRU.

The eNB may be aware on the subframe as the grant, whether the WTRU may have obtained the channel. Subsequent grants may be assigned a retry delay parameter accordingly. Such a scheme may help the scheduler in situations where the length of access of the SuppCC by a contending scheme may be known by the eNB through coexistence information, or where the aggressiveness of the scheduler in trying to access the LE bands may change dynamically.

In order to send the successfulness of the WTRU to access the LE channel corresponding to the SuppCC, the PUCCH may be used or the information may be piggybacked on the PUSCH. In particular, an "LE channel available" information element may be added to the list of UCI information transmitted by the WTRU in LTE. A set of rules may be used to determine the resource in which this information element may be sent. If a licensed uplink grant (e.g., PUSCH) is available on the subframe where the 'LE channel available' is to be sent, the 'LE channel available' may be multiplexed with the data on the PUSCH. If a licensed uplink grant (e.g., PUSCH) may not be available on the subframe where the 'LE channel available' is to be sent, the 'LE channel available' may be sent on the PUCCH on the PCC.

Multiple SuppCC uplink grants may be available on one subframe. The WTRU may transmit a bitmap of x bits, where each bit may represent one of the SuppCCs that may be configured for uplink operation in the WTRU. The bitmap ordering may be specified by RRC configuration.

Figure 21:
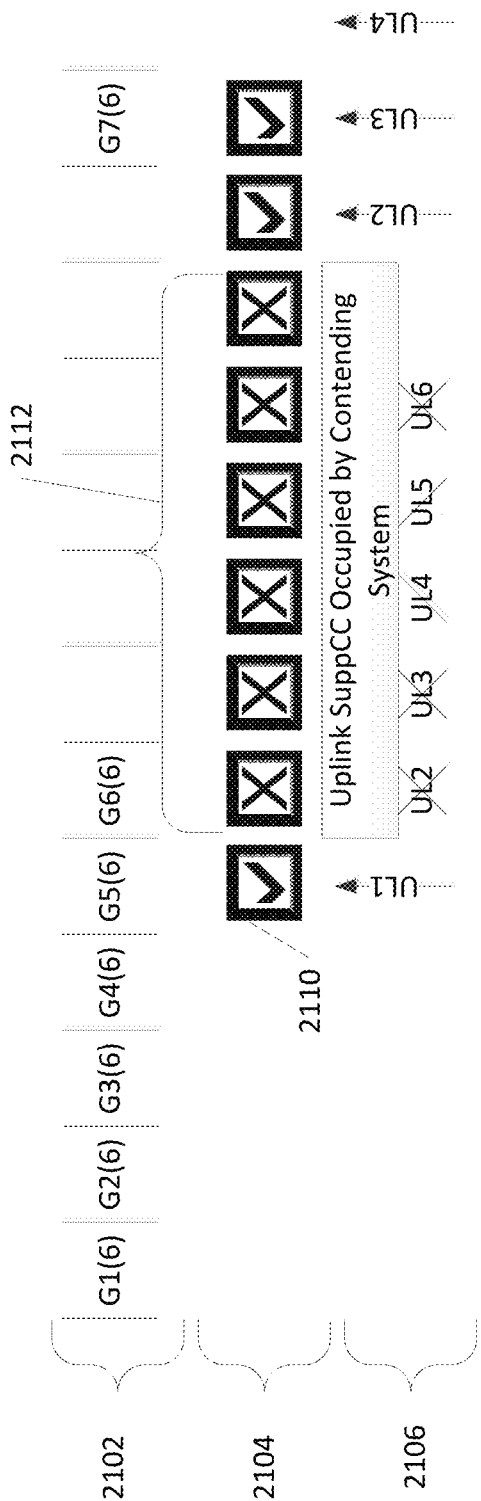
FIG. 21 illustrates by example, the use of retry delay parameter with grants in PDCCH.

FIG. 21 illustrates an example of the use of the retry delay parameter (value of the retry delay shown in parenthesis with each of the grants (as shown in 2102). The grants in the figure may include grants to different WTRUs or distinct grants sent to the same WTRU.

A WTRU may receive the retry delay parameter r and the number of maximum retries n from RRC configuration or with the system information associated with each SuppCC. When a grant for uplink transmission on the SuppCC 2106 may be received by the WTRU, it may perform an initial sensing for some time just prior to (or during) the subframe where the grant may take effect. If the channel is available, the WTRU may indicate the availability to the eNB, using the logical feedback channel 2104, and may use the grant. If the channel is unavailable, e.g., during subframes 2112, the WTRU, after r subframes, may again perform the initial sensing. When the channel is available, the WTRU may indicate the availability to the eNB using the logical feedback channel 2104. If n unsuccessful attempts to access the channel have been made, the grant may no longer be valid, and the eNB may schedule a new grant at a later time. The value of n may be specified using a special reserved value indicating an infinite number of retries, or number of retries until the SuppCC may be deactivated.

In order to reduce the impact on PDCCH resources in the licensed band, PDCCH may be transmitted on the SuppCC, when the channel quality of the SuppCC may allow the transmission. Since the availability of the LE bands (and of any SuppCCs that have been activated from the perspective of a WTRU) may be subject to sensing at the eNB prior to transmission, a WTRU may be notified of the availability or unavailability of the LE bands to provide PDCCH to the WTRU.

Since the availability or unavailability of the LE bands due to the presence of known coexistence gaps may change from one subframe to another, such messaging may be signaled to the WTRUs using the licensed band PDCCH. On the current or next subframe from reception of this message on the PDCCH (depending on whether an offset is configured for the LE bands), the WTRUs may receive indication of the need to decode PDCCH on the LE bands. The common search space in the licensed band PDCCH may be used to transmit a short message (typically a format1C or similar message) using an RNTI that may be common to the WTRUs utilizing the LE bands (e.g., an LE-RNTI). The message may include: the Carrier Indicator Field (CIF) of the SuppCC that may be enabled and/or disabled in the current or next subframe, and the operation (enable listening for PDCCH or disable listening for PDCCH) that may apply to that SuppCC. Such an indication may be used in conjunction with a predefined coexistence gap that may occur at a fixed time and may be signaled to the WTRUs using similar signaling or other means (e.g., MAC CE, RRC messaging, etc.).

Figure 22:
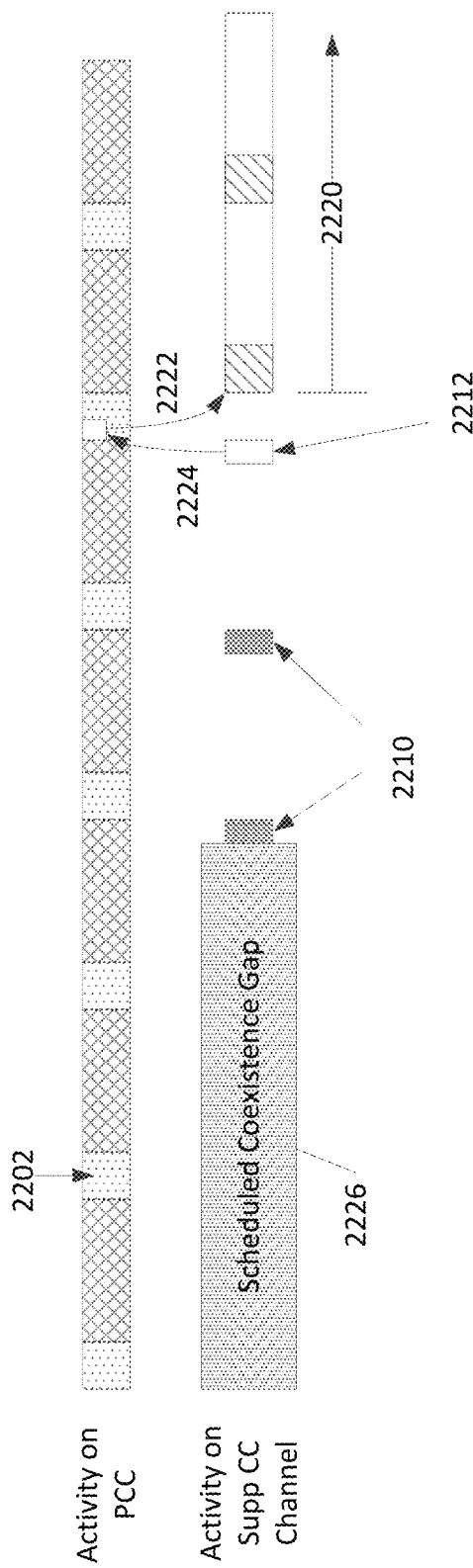
FIG. 22 illustrates by example, SuppCC PDCCH enabled from PCC PDCCH.

FIG. 22 illustrates the use of the signaling to enable PDCCH 2202 on the LE bands at the end of a known coexistence period or coexistence gap 2226. The coexistence gap may be scheduled by the eNB and its starting point and duration may be signaled to the WTRUs via RRC signaling. At the end of the gap, the eNB may perform sensing 2210 and 2212 of the channel used by the SuppCC to determine its availability and may use the channel when unoccupied. When the channel is determined to be unoccupied, at 2224, the eNB may transmit a special format 1C message 2222 in the common search space addressed to the LE-RNTI to notify the LE-capable WTRUs to start decoding PDCCH 2220 on the activated SuppCC. This message may be specific to each SuppCC, since coexistence gaps on individual SuppCCs may not be time synchronized. A sufficient delay may be assumed between the licensed band carrier (such as PCC, and/or SCC) and the SuppCC to allow the command for enabling the WTRUs to decode the SuppCC PDCCH to be applied to the same subframe. In the case where no offset may exist, the command and/or message may apply to the next subframe.

In an embodiment, to reduce PDCCH load when introducing SuppCC, the PDCCH may be embedded into the downlink allocation. Timing rules discussed herein may also be applicable to aggregation of a TDD CC with an FDD CC in the licensed band.

Figure 23:
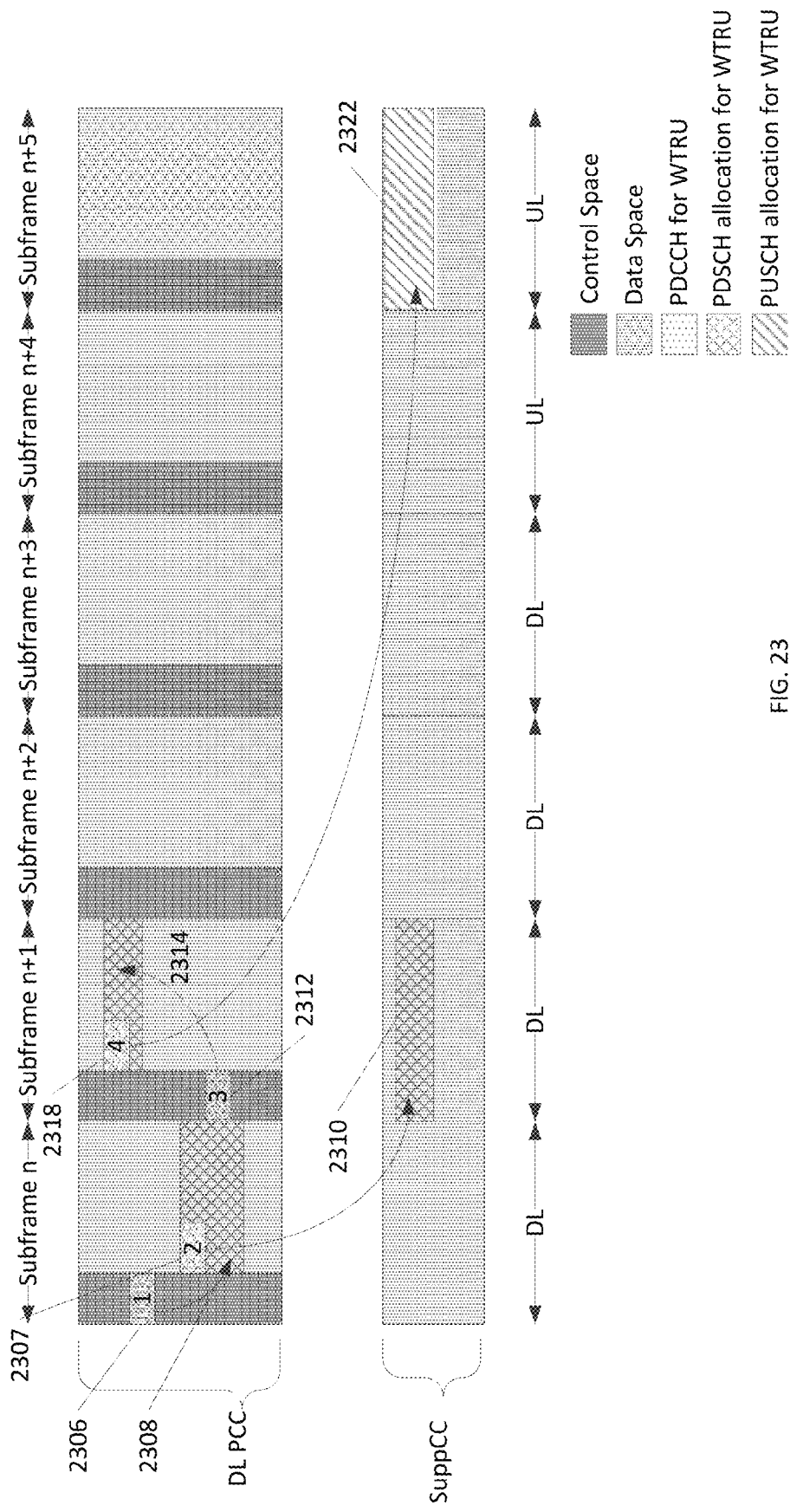
FIG. 23 illustrates by example, uplink grants and downlink allocations through data-embedded PDCCH.

FIG. 23 illustrates the timing involved for uplink grants and downlink allocations for a TDD SuppCC. For dynamic FDD, in the case of uplink-only supplementary cells, uplink grants for supplementary cells may piggyback on allocated PRBs (in the data space) in the primary or secondary cell. If no downlink transmission is planned for the WTRU for a given subframe, the eNB may allocate some PRBs to carry the uplink grants using a specific DCI, or may fall back on UL grant signaling through the PDCCH in the control region.

In FIG. 23, PDCCH 1, 2306 and PDCCH 3, 2312 may, for example, allocate DL data for the WTRU on the DL PCC. Within both these DL allocations, a data-embedded PDCCH may be sent for the WTRU. PDCCH 2, 2307 may, for example, allocate DL data on the SuppCC in subframe n+1. PDCCH 4 2318 may, for example, allocate UL resources 2322 on the SuppCC in subframe n+5.

When a data-embedded PDCCH is sent for a downlink allocation in the PDSCH of subframe n 2308, for example, the downlink allocation in the SuppCC may take effect in subframe n+1 for dynamic FDD and subframe n+k for TDD, where k may refer to the number of subframes until the next DL subframe in the SuppCC TDD configuration. When a data-embedded PDCCH is sent for an uplink grant in the PDSCH of subframe n, for example, the uplink grant may take effect in subframe n+4 for dynamic FDD and n+k for TDD, where k may be obtained using a procedure for uplink. This procedure may be extended to account for allocation of UL grants that may occur from subframes that may not be DL subframes in the SuppCC (because the grants may be made in the licensed FDD CC). Tables 6, 7, and 8 provide the mapping of PCC/SCC grants and uplink allocation on SuppCC to which grant applies. The tables 6-8, for example, use TDD UL/DL Configuration 0, 1, and 2. The other configurations may be determined in a similar fashion.

TABLE 6

| UL/DL | D | S | U | U | U | D | S | U | U | U |
|---|---|---|---|---|---|---|---|---|---|---|
| Grant on PCC/SCC | a | b | c | d | e | f | g | h | i | J |
| Uplink Allocation on SuppCC to which grant applies | | g, h | i | j | a | | b, c | d | e | f |

TABLE 7

| UL/DL | D | S | U | U | D | D | S | U | U | D |
|---|---|---|---|---|---|---|---|---|---|---|
| Grant on PCC/SCC | a | b | c | d | e | f | g | h | i | J |
| Uplink Allocation on SuppCC to which grant applies | | f, g, h | i | j | | | a, b, c | d | e | |

TABLE 8

| UL/DL | D | S | U | D | D | S | U | D | D |
|---|---|---|---|---|---|---|---|---|---|
| Grant on PCC/SCC | a | b | c | d | e | f | g | h | i | J |
| Uplink Allocation on SuppCC to which grant applies | | E, f, g, h | i | | | | j, a, b, c | d | | |

Other timing relationships may be possible. As the FIG. 23 shows, for example, there may be a 1-subframe delay between the data-embedded PDCCH for downlink allocation 2308 and the SuppCC resource that it may allocate 2310. This delay may be eliminated by assuming that the SuppCC may be offset by a sufficient amount of time from the licensed CCs.

When a SuppCC is, for example, a TDD, or where the DCI formats for signaling of the SuppCC in dynamic FDD may require some additions, a WTRU supporting the LE bands may need to decode new as well as legacy DCI formats. Separate search spaces may be used for the two types of formats that may provide savings in the number of blind decodings performed by the WTRUs supporting the LE bands.

The DCI formats for the SuppCC may be TDD DCI formats or dynamic FDD Supp CC. The dynamic FDD SuppCC DCI formats may require some additions compared to legacy LTE formats in order to schedule allocations and grants.

Differentiation of TDD and FDD (legacy) DCI formats by the LE-enabled WTRUs may be provided based on the search space defined for a particular value of $n_{CI}$ (equation 2). For example, with an $n_{CI}$ of 0, one set of search space candidates may be defined, and with a value of 1, a separate set of candidates may be defined. For PDCCH candidates that correspond to a value of $n_{CI}$ indicating a licensed band carrier, the LE-WTRU may decode FDD DCI formats, since the scheduled allocations and grants may be related to an FDD component carrier. For the PDCCH candidates associated with a $n_{CI}$ value corresponding to a SuppCC, the WTRU may decode TDD DCI formats, since these DCI messages may be associated with allocations or grants made on the TDD SuppCC.

Figure 24:
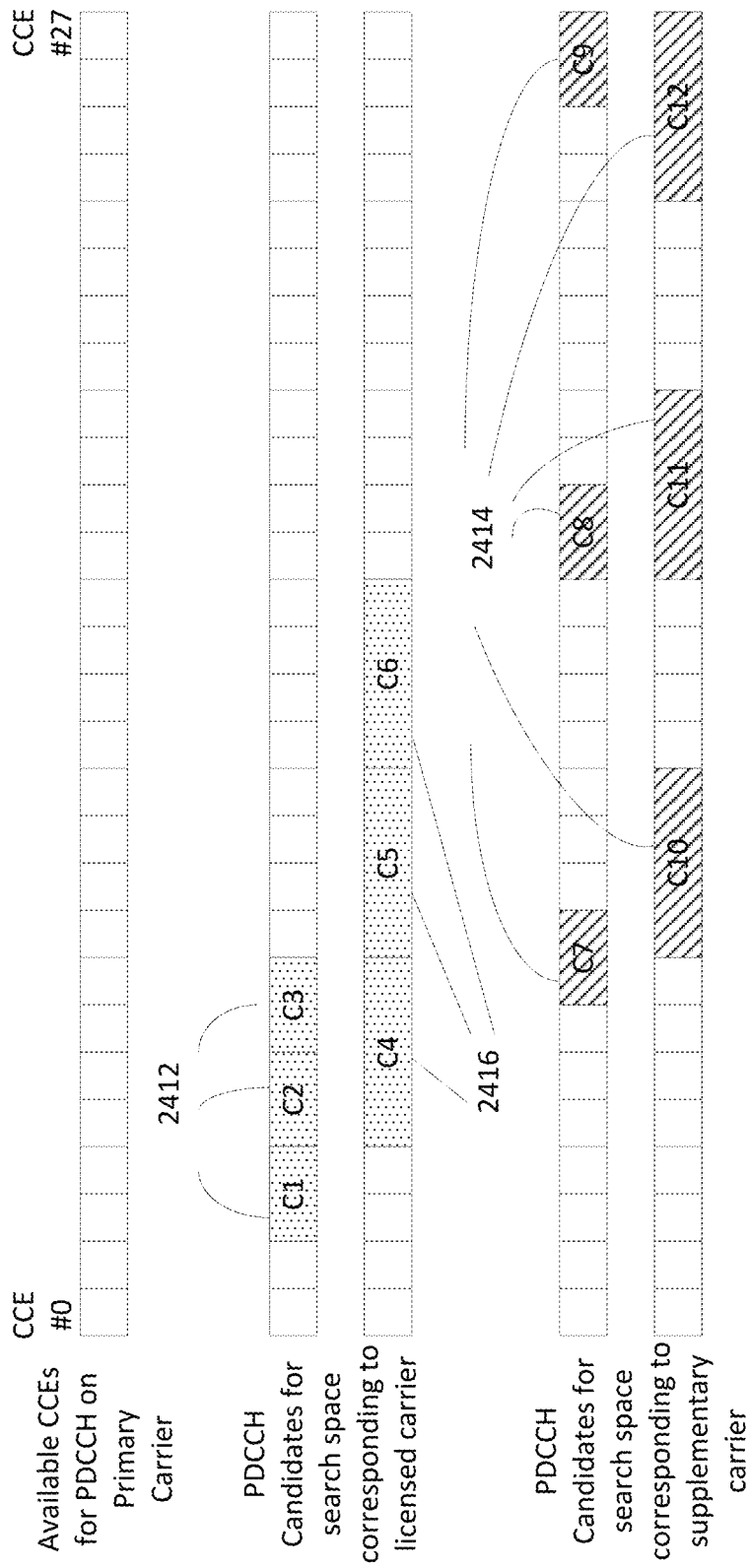
FIG. 24 illustrates by example, PDCCH candidates with DCI formats determined by search space.

FIG. 24 illustrates by example, 6 PDCCH candidates spread over 2 levels of search spaces (e.g., level 2 (2412) and level 4 (2416). PDCCH candidates C1-C6 may be defined for the search spaces related to a value of $n_{CI}$ corresponding to a licensed band carrier. For these candidates, the WTRU may decode the FDD PDCCH formats. PDCCH candidates C7-C12 (2414) may be defined for the search spaces related to a value of $n_{CI}$ corresponding to a SuppCC. For candidates C7-C12, the WTRU may decode the TDD PDCCH formats.

Due to the randomization created by the equation given, for example, in section 9.1.1 of 3GPP TS 36.213 v10.1.0, search space candidates obtained for different $n_{CI}$ but with the same size (aggregation level) may overlap perfectly. For example the candidates C3 and C7 in FIG. 24. For example, the WTRU may decode for both the TDD and FDD formats, which may increase the number of blind decodings that a WTRU may need to perform in comparison with a simplistic scenario of legacy carrier aggregation (or in the case where the SuppCC may be FDD). The additional blind decodings may be avoided by defining certain rules for overlapping search space candidates. For instance, in such candidates, the eNB/HeNB may transmit an FDD DCI format, and such a DCI message may address a licensed band carrier.

The WTRU may decode the control information by determining the search spaces with multiple PDCCH candidates. The PDCCH search space candidates may be distinct and may have distinct beginning, end point or the aggregation level mode or size. The WTRU may perform blind decoding based on the DCI format type specific to a search space.

For cross-carrier scheduling of the TDD SuppCC (with TDD frame structure), certain subframes may require a greater number of PDCCH resources than others. Assuming an equal uplink and downlink bandwidth on the SuppCC (equal number of downlink resource allocations and uplink grants on average), or downlink heavy traffic, the number of PDCCH resources allocated for cross-carrier scheduling the SuppCC may be larger in subframes that correspond to a downlink subframe in TDD. During uplink subframes, the PDCCH resources may require uplink grants (that may take effect in future subframes) or power control commands. The power consumption and overall blind decoding complexity of a LE-enabled WTRU may be simplified by taking this factor into account and dynamically changing the number of search space candidates associated with the search spaces defined by $n_{CI}$ corresponding to a SuppCC. The dynamic change in the number of search space candidates may be tailored to the traffic load (uplink heavy versus downlink heavy) by having the RRC signal the change to the LE-enabled WTRUs through a load factor.

One way to enable this dynamic change in the number of candidates may be to change $M^{(L)}$ in the question for subframes that correspond to uplink subframes on the TDD SuppCC based on the load (uplink heavy or downlink heavy) as specified by the RRC. When applying this equation for a value of $n_{CI}$ corresponding to the SuppCC, the value of $M^{(L)}$ in a subframe corresponding to an uplink subframe in the SuppCC may be given by following equation:

$$M^{(L)} = \lfloor l \cdot c \cdot M^{(L)} \rfloor \qquad \text{Equation 4}$$

where l may be a multiplicative factor that takes into account the load of the SuppCC (and may be smaller when the load is downlink heavy) and c may be defined based on the current subframe in the UL/DL configuration in order to potentially provide further granularity on decreasing the number of PDCCH candidates corresponding to the SuppCC that need to be searched in certain uplink subframes.

The actual PDCCH candidates may be configured on a per case basis through a table instead of using the equation. For example, on a specific subframe and for a specific TDD UL/DL configuration, the table in question may define exactly the number of search candidates for which the LE WTRUs may perform blind decoding. This may allow, for example, the elimination of a specific level of aggregation entirely during the uplink subframes if the level of aggregation may not be required in order to send the DCI formats 0, 3, 3A, and 4 (used for power control and uplink grants).

In an embodiment, the impact of LE-enabled WTRUs on legacy LTE Rel.8 and/or 10 WTRUs may be reduced by making use of the unequal number of DCI messages that may be expected when comparing subframes corresponding to a downlink subframe on the TDD SuppCC and subframes corresponding to uplink subframes on the supplementary component carriers. Because DL allocations (2506) may be scheduled in the same subframe as they are sent, it may be expected that the PDCCH usage by the SuppCC is heavier in the downlink subframes than in the uplink subframes. This may lead to blocking of the LE-enabled WTRUs, and the legacy WTRUs using the same primary or secondary component carrier.

Figure 25:
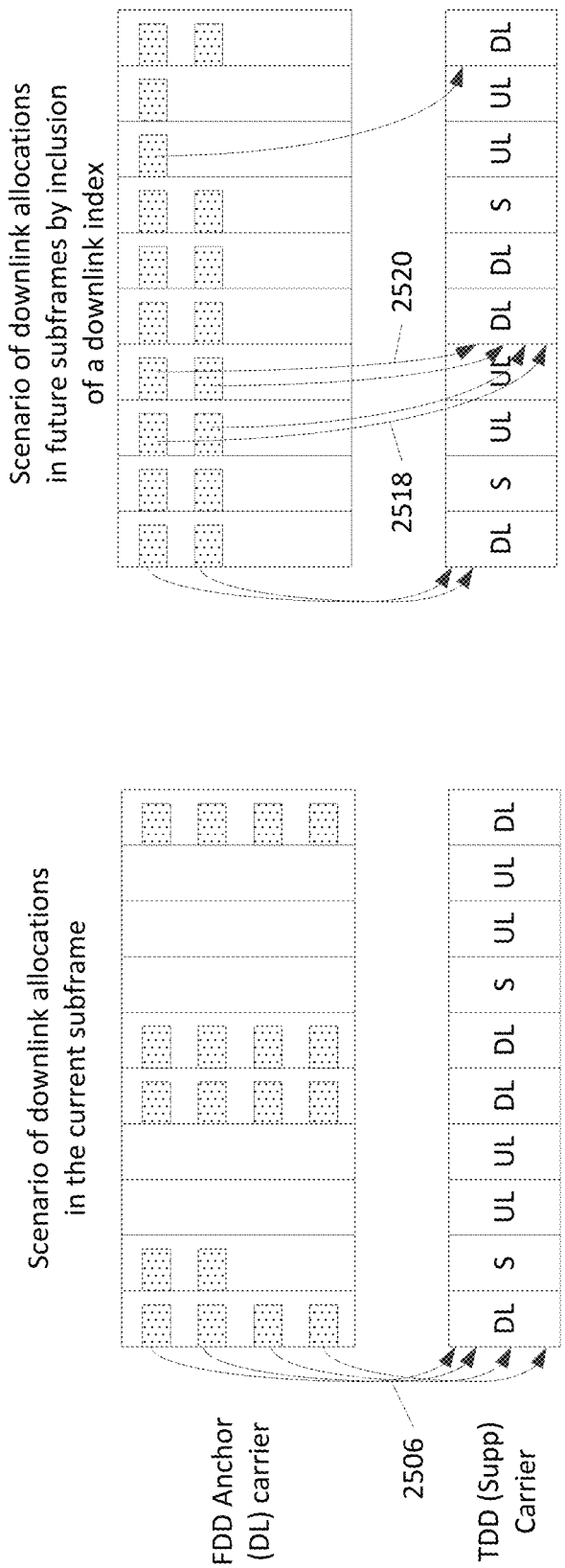
FIG. 25 illustrates by example, distribution of the PDCCH load over a frame.

In order to alleviate the blocking issue, the scheduler may move some of the downlink allocations to DCI formats sent during uplink subframes (2518 and 2520) on the SuppCC. Similar to the uplink index, an indicator may be provided to specify the subframe number or subframe offset where the allocation may actually take place relative to where the DCI message is sent. FIG. 25 illustrates the distribution of the PDCCH load over an entire frame.

As the downlink allocations for resources in the SuppCC may be distributed over a plurality of subframes, the potential of blocking may be decreased. Furthermore, since the DCI formats associated with the SuppCCs may be transmitted in separate search spaces, there may be no compatibility issues with legacy WTRUs, and the TDD DCI formats corresponding to scheduling in the SuppCC may be easily extended to include a downlink index field.

In an embodiment, the LE-enabled WTRUs may receive or decode TDD DCI formats in the WTRU-specific search spaces, regardless of the type of carrier (TDD supplementary or FDD licensed) they refer to. In the case where the DCI message may be specific to the FDD licensed band carrier, the TDD-specific fields in the DCI format may be ignored. The CIF field of the DCI format may be used to indicate the CC, the DL assignment and/or UL grant may apply to, and based on the information may interpret the DCI bits accordingly. For example, if the CIF field points to a CC in the licensed band, the DCI format may be interpreted as FDD, and the additional (padding) bits may be ignored. If the CIF field points to a TDD SuppCC, then the DCI format may be interpreted as TDD.

Figure 26:
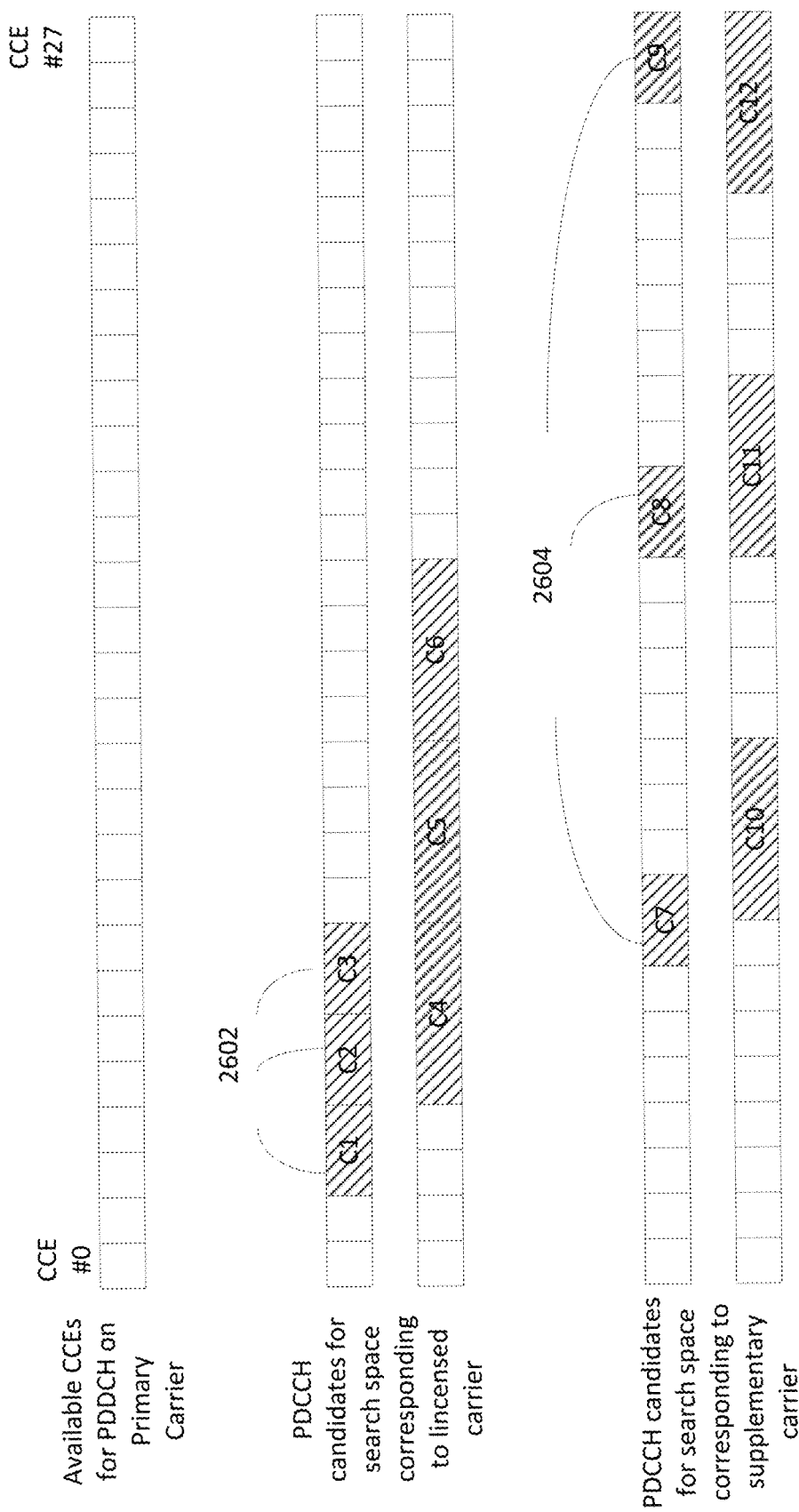
FIG. 26 illustrates by example, the use of TDD DCI formats by LE-enabled WTRUs.

FIG. 26 illustrates the use of TDD DCI formats for the LE-enabled WTRUs. As shown in the FIG. 26, in the case of overlapping candidates with similar aggregation level mode, for example, C3 and C7, the WTRU may not perform twice the number of blind decodings in the previous scenario. The main drawback may be that the eNB and/or HeNB may be forced to use extra bits for scheduling of FDD carriers in the WTRU specific search space for the LE-enabled WTRUs.

Similar to the use of TDD DCI formats (described above), padding may also be used to ensure sending DCI formats that refer to either TDD or FDD in the same search space candidates (or overlapping search space candidates) without the need to perform independent blind decodings for the two different formats. A distinct format may be provided with length sufficient for specifying the TDD case. In order for the same blind decoding to be able to decode the FDD-specific DCI messages, these messages may be padded to the same number of bits as the TDD length. The interpretation of the contents of the message (once it may be decoded as a match) may then depend on the value of the CIF, and whether that value refers to a licensed (FDD) component carrier or a supplementary (TDD) carrier. Assuming that the FDD DCI formats may be used to signal information for the SuppCC, the legacy LTE FDD DCI formats may be used.

In an embodiment, a WTRU may receive resource allocation by receiving a mapping rule message and mapping information of LCC and SuppCC. The mapping rule message may indicate physical resource block (PRB) allocation on a licensed component carrier (LCC) to related PRB allocation on a supplementary component carrier (SuppCC). Using the mapping rule message and the mapping information, the WTRU may determine PRBs allocated on the SuppCC.

The mapping rule message may be received periodically, and may be indicated via a carrier indicator field (CIF).

The mapping rule message may be received via a radio resource control RRC signal or a medium access control-control element (MAC-CE).

In an embodiment, the PRB allocation on the SuppCC may specify a hybrid automatic retransmission request (HARQ) information using downlink control information (DCI) format specific to the SuppCC. The HARQ information may include, for example, new data indicator (NDI), and redundancy version (RV).

In an embodiment, a WTRU may determine cross-carrier scheduling by receiving, via radio resource control (RRC), a configuration signal. The RRC configuration signal may include an indication to use a supplementary cell (SuppCell) for physical control channel (PDCCH). The WTRU may acknowledge the configuration received via RRC signaling, start reading PDCCH on the SuppCell.

In an embodiment, possibility of future congestion may be determined based on a number of wireless transmit receive units (WTRU) attached and bandwidth of a primary cell. Based on the congestion determination, the SuppCell may be configured to have physical downlink shared channel (PDSCH) start at orthogonal frequency-division multiplexing (OFDM) symbol at 3, and moving a WTRU to the SuppCell. When the possibility of future congestion is not present, the SuppCell may be configured to have PDSCH start at OFDM symbol 0.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A wireless transmit receive unit (WTRU) configured to process control information when receiving information on a primary component carrier (PCC) and a supplementary component carrier (SuppCC), the WTRU comprising:
   a processor configured to:
      receive a first PCC subframe, the first PCC subframe comprising a control portion and a data portion, the control portion comprising resource assignment information associated with a downlink shared channel on the PCC;
      identify in the data portion of the first PCC subframe, second resource assignment information associated with a downlink shared channel on the SuppCC, wherein the SuppCC is a time division duplex (TDD) component carrier having a subset of SuppCC subframes allocated for the WTRU to receive information; and
      process a first SuppCC subframe of the downlink shared channel on the SuppCC in accordance with the identified second resource assignment information associated with the downlink shared channel on the SuppCC, wherein the first SuppCC subframe is subsequent to the first PCC subframe, and wherein the first SuppCC subframe is in the subset of SuppCC subframes.

2. The WTRU of claim 1, the processor is further configured to:
- receive a second PCC subframe, the second PCC subframe comprising a control portion and a data portion, the control portion comprising third resource assignment information associated with the downlink shared channel on the PCC;
- identify, in the data portion of the second PCC subframe, fourth resource assignment information associated with an uplink shared channel on the SuppCC; and
- send information in, a second SuppCC subframe of the uplink shared channel on the SuppCC in accordance with the identified fourth resource assignment information associated with the uplink shared channel on the SuppCC, wherein the second SuppCC subframe is subsequent to the second PCC subframe.

3. The WTRU of claim 2, wherein the fourth resource assignment information associated with the uplink shared channel on the SuppCC comprises an uplink grant associated with the second SuppCC subframe of the uplink shared channel on the SuppCC.

4. The WTRU of claim 2, wherein the second SuppCC subframe is an uplink subframe.

5. The WTRU of claim 1, wherein the first SuppCC subframe immediately follows the first PCC subframe carrying the second resource assignment information.

6. A method for processing control information when receiving information on a primary component carrier (PCC) and a supplementary component carrier (SuppCC), the method comprising:
- receiving a first PCC subframe, the first PCC subframe comprising a control portion and a data portion, the control portion comprising first resource assignment information associated with a downlink shared channel on the PCC;
- identifying, in the data portion of the first PCC subframe, second resource assignment information associated with a downlink shared channel on the SuppCC, wherein the SuppCC is a time division duplex (TDD) component carrier having a subset of SuppCC subframes allocated for the WTRU to receive information; and
- processing, a first SuppCC subframe of the downlink shared channel on the SuppCC in accordance with the identified second resource assignment information associated with the downlink shared channel on the SuppCC, wherein the first SuppCC subframe is subsequent to the first PCC subframe, and wherein the first SuppCC subframe is in the subset of SuppCC subframes.

7. The method of claim 1, further comprising
- receiving a second PCC subframe, the second PCC subframe comprising a control portion and a data portion, the control portion comprising third resource assignment information associated with the downlink shared channel on the PCC;
- identifying, in the data portion of the second PCC subframe, fourth resource assignment information associated with an uplink shared channel on the SuppCC; and
- sending information in, a second SuppCC subframe of the uplink shared channel on the SuppCC in accordance with the identified fourth resource assignment information associated with the uplink shared channel on the SuppCC, wherein the second SuppCC subframe is subsequent to the second PCC subframe.

8. The method of claim 7, wherein the fourth resource assignment information associated with the uplink shared channel on the SuppCC comprises an uplink grant associated with the second SuppCC subframe.

9. The method of claim 7, wherein the second SuppCC subframe is an uplink subframe.

10. The method of claim 6, wherein the first SuppCC subframe immediately follows the first PCC subframe carrying the second resource assignment information.

* * * * *